(12) United States Patent
Huang et al.

(10) Patent No.: US 10,834,711 B2
(45) Date of Patent: Nov. 10, 2020

(54) SELECTIVELY MULTIPLEXING PHYSICAL UPLINK SHARED CHANNEL (PUSCH) AND PHYSICAL UPLINK CONTROL CHANNEL (PUCCH) COMMUNICATIONS

(71) Applicant: QUALCOMM Incorporated, San Diego, CA (US)

(72) Inventors: Yi Huang, San Diego, CA (US); Amir Aminzadeh Gohari, Sunnyvale, CA (US); Sony Akkarakaran, Poway, CA (US); Renqiu Wang, San Diego, CA (US); Wei Yang, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 16/382,929

(22) Filed: Apr. 12, 2019

(65) Prior Publication Data

US 2019/0320431 A1 Oct. 17, 2019

Related U.S. Application Data

(60) Provisional application No. 62/659,036, filed on Apr. 17, 2018.

(51) Int. Cl.
*H04W 74/04* (2009.01)
*H04W 72/04* (2009.01)
(Continued)

(52) U.S. Cl.
CPC ....... *H04W 72/0413* (2013.01); *H04L 1/1861* (2013.01); *H04W 72/14* (2013.01)

(58) Field of Classification Search
CPC .................................................. H04W 72/04
See application file for complete search history.

(56) References Cited

U.S. PATENT DOCUMENTS

2013/0176953 A1* 7/2013 Stern-Berkowitz ........................
H04W 52/281
370/329

FOREIGN PATENT DOCUMENTS

JP 5431983 B2 3/2014

OTHER PUBLICATIONS

Huawei et al., "Transmission of PUCCH and PUSCH with Partial Overlap", 3GPP Draft; R1-1802692, 3rd Generation Partnership Project (3GPP), Mobile Competence Centre ; 650, Route Des Lucioles ; F-06921 Sophia-Antipolis Cedex; France, vol. RAN WG1. No. Athens, Greece; Feb. 26, 2018-Mar. 2, 2018, Feb. 17, 2018 (Feb. 17, 2018), XP051398125, 3 Pages, Retrieved from the Internet: URL:http://www.3gpp.org/ftp/tsg%5Fran/WG1%5FRL1/TSGR1%6F92/Docs/ [retrieved on Feb. 17, 2018], Section 2, figure 1.

(Continued)

*Primary Examiner* — Sulaiman Nooristany
(74) *Attorney, Agent, or Firm* — Paul Kuo

(57) ABSTRACT

Various aspects of the present disclosure generally relate to wireless communication. In some aspects, a user equipment determine that a physical uplink shared channel (PUSCH) communication, scheduled by an uplink grant, and a physical uplink control channel (PUCCH) communication, corresponding to a physical downlink shared channel (PDSCH) communication scheduled by a downlink grant, are scheduled to overlap in one or more symbols; determine a threshold time based at least in part on an earliest scheduled starting time of the PUSCH communication or the PUCCH communication; selectively multiplex the PUSCH communication and the PUCCH communication based at least in part on whether the uplink grant, the downlink grant, and the PDSCH communication are received before the threshold time; and transmit the PUSCH communication, the PUCCH (Continued)

communication, or both the PUSCH communication and the PUCCH communication based at least in part on the selective multiplexing. Numerous other aspects are provided.

35 Claims, 15 Drawing Sheets

(51) Int. Cl.
*H04L 1/18* (2006.01)
*H04W 72/14* (2009.01)

(56) References Cited

OTHER PUBLICATIONS

International Search Report and Written Opinion—PCT/US2019/027528—ISA/EPO—Jul. 25, 2019.

* cited by examiner

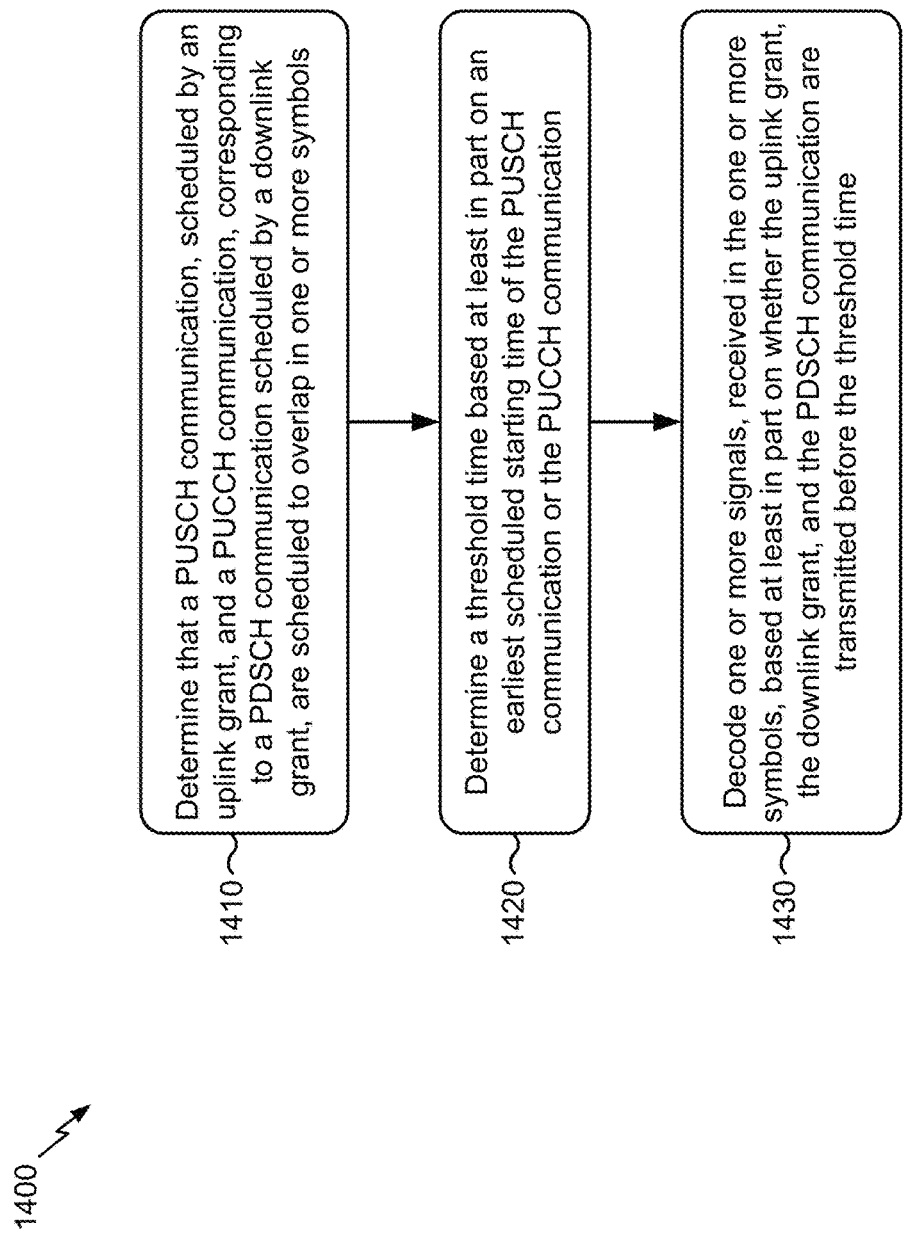

SELECTIVELY MULTIPLEXING PHYSICAL UPLINK SHARED CHANNEL (PUSCH) AND PHYSICAL UPLINK CONTROL CHANNEL (PUCCH) COMMUNICATIONS

CROSS-REFERENCE TO RELATED APPLICATIONS UNDER 35 U.S.C. § 119

This application claims priority to U.S. Provisional Patent Application No. 62/659,036, filed on Apr. 17, 2018, entitled "TECHNIQUES AND APPARATUSES FOR SELECTIVELY MULTIPLEXING PHYSICAL UPLINK SHARED CHANNEL (PUSCH) AND PHYSICAL UPLINK CONTROL CHANNEL (PUCCH) COMMUNICATIONS," which is hereby expressly incorporated by reference herein.

FIELD OF THE DISCLOSURE

Aspects of the present disclosure generally relate to wireless communication and to techniques and apparatuses for selectively multiplexing PUSCH and PUCCH communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication, performed by a user equipment (UE), may include determining that a physical uplink shared channel (PUSCH) communication, scheduled by an uplink grant, and a physical uplink control channel (PUCCH) communication, corresponding to a physical downlink shared channel (PDSCH) communication scheduled by a downlink grant, are scheduled to overlap in one or more symbols; determining a threshold time based at least in part on an earliest scheduled starting time of the PUSCH communication or the PUCCH communication; selectively multiplexing the PUSCH communication and the PUCCH communication based at least in part on whether the uplink grant, the downlink grant, and the PDSCH communication are received before the threshold time; and transmitting the PUSCH communication, the PUCCH communication, or both the PUSCH communication and the PUCCH communication based at least in part on the selective multiplexing.

In some aspects, a user equipment for wireless communication may include memory and one or more processors operatively coupled to the memory. The memory and the one or more processors may be configured to determine that a PUSCH communication, scheduled by an uplink grant, and a PUCCH communication, corresponding to a PDSCH communication scheduled by a downlink grant, are scheduled to overlap in one or more symbols; determining a threshold time based at least in part on an earliest scheduled starting time of the PUSCH communication or the PUCCH communication; selectively multiplexing the PUSCH communication and the PUCCH communication based at least in part on whether the uplink grant, the downlink grant, and the PDSCH communication are received before the threshold time; and transmitting the PUSCH communication, the PUCCH communication, or both the PUSCH communication and the PUCCH communication based at least in part on the selective multiplexing.

In some aspects, a non-transitory computer-readable medium may store one or more instructions for wireless communication. The one or more instructions, when executed by one or more processors of a user equipment, may cause the one or more processors to determine that a PUSCH communication, scheduled by an uplink grant, and a PUCCH communication, corresponding to a PDSCH communication scheduled by a downlink grant, are scheduled to overlap in one or more symbols; determining a threshold time based at least in part on an earliest scheduled starting time of the PUSCH communication or the PUCCH communication; selectively multiplexing the PUSCH communication and the PUCCH communication based at least in part on whether the uplink grant, the downlink grant, and the PDSCH communication are received before the threshold time; and transmitting the PUSCH communication, the PUCCH communication, or both the PUSCH communication and the PUCCH communication based at least in part on the selective multiplexing.

In some aspects, an apparatus for wireless communication may include means for determining that a PUSCH communication, scheduled by an uplink grant, and a PUCCH communication, corresponding to a PDSCH communication scheduled by a downlink grant, are scheduled to overlap in one or more symbols; means for determining a threshold time based at least in part on an earliest scheduled starting time of the PUSCH communication or the PUCCH communication; means for selectively multiplexing the PUSCH communication and the PUCCH communication based at least in part on whether the uplink grant, the downlink grant, and the PDSCH communication are received before the threshold time; and means for transmitting the PUSCH communication, the PUCCH communication, or both the PUSCH communication and the PUCCH communication based at least in part on the selective multiplexing.

In some aspects, a method for wireless communication, performed by a base station, may include determining that a PUSCH communication, scheduled by an uplink grant, and a PUCCH communication, corresponding to a PDSCH communication scheduled by a downlink grant, are scheduled to overlap in one or more symbols; determining a threshold time based at least in part on an earliest scheduled starting time of the PUSCH communication or the PUCCH communication; and decoding one or more signals, received in the one or more symbols, based at least in part on whether the uplink grant, the downlink grant, and the PDSCH communication are transmitted before the threshold time.

In some aspects, a base station for wireless communication may include memory and one or more processors operatively coupled to the memory. The memory and the one or more processors may be configured to determine that a PUSCH communication, scheduled by an uplink grant, and a PUCCH communication, corresponding to a PDSCH communication scheduled by a downlink grant, are scheduled to overlap in one or more symbols; determine a threshold time based at least in part on an earliest scheduled starting time of the PUSCH communication or the PUCCH communication; and decode one or more signals, received in the one or more symbols, based at least in part on whether the uplink grant, the downlink grant, and the PDSCH communication are transmitted before the threshold time.

In some aspects, a non-transitory computer-readable medium may store one or more instructions for wireless communication. The one or more instructions, when executed by one or more processors of a base station, may cause the one or more processors to determine that a PUSCH communication, scheduled by an uplink grant, and a PUCCH communication, corresponding to a PDSCH communication scheduled by a downlink grant, are scheduled to overlap in one or more symbols; determine a threshold time based at least in part on an earliest scheduled starting time of the PUSCH communication or the PUCCH communication; and decode one or more signals, received in the one or more symbols, based at least in part on whether the uplink grant, the downlink grant, and the PDSCH communication are transmitted before the threshold time.

In some aspects, an apparatus for wireless communication may include means for determining that a PUSCH communication, scheduled by an uplink grant, and a PUCCH communication, corresponding to a PDSCH communication scheduled by a downlink grant, are scheduled to overlap in one or more symbols; means for determining a threshold time based at least in part on an earliest scheduled starting time of the PUSCH communication or the PUCCH communication; and means for decoding one or more signals, received in the one or more symbols, based at least in part on whether the uplink grant, the downlink grant, and the PDSCH communication are transmitted before the threshold time.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 14 is a diagram illustrating an example process performed, for example, by a base station, in accordance with various aspects of the present disclosure.

DETAILED DESCRIPTION

Figure 1:
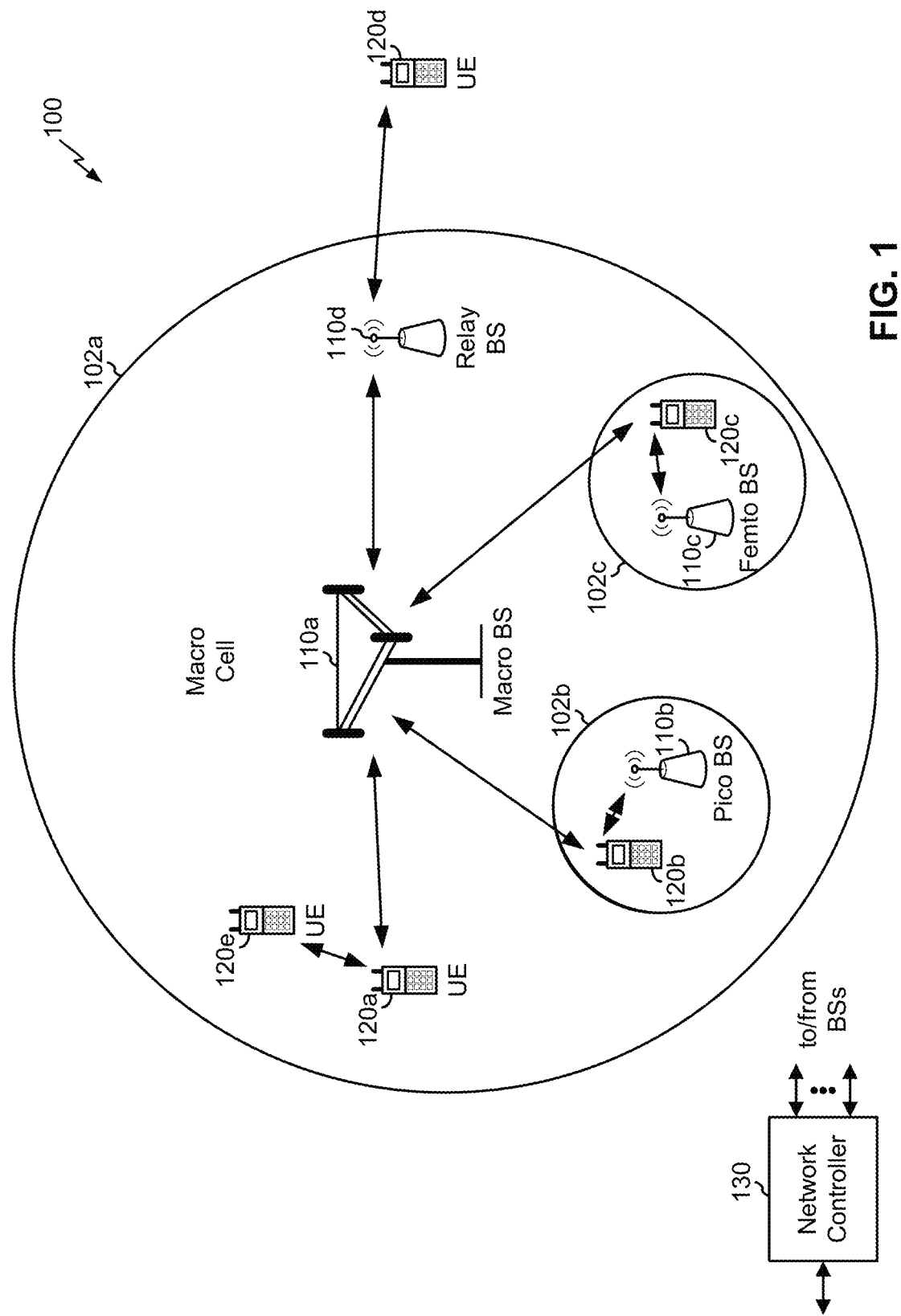
FIG. 1 is a block diagram conceptually illustrating an example of a wireless communication network, in accordance with various aspects of the present disclosure.

In a wireless communication system, such as 5G, a UE may multiplex communications on different physical channels. For example, the UE may multiplex a PUCCH communication (e.g., that includes uplink control information (UCI), such as acknowledgment or negative acknowledgement (ACK/NACK) feedback and/or the like) and a PUSCH communication. In some aspects, the UE may multiplex the PUCCH communication and the PUSCH communication by piggybacking the PUCCH communication in the PUSCH communication, which may include puncturing (e.g., dropping) one or more bits of the PUSCH communication and replacing the punctured PUSCH bit(s) with bit(s) of the PUCCH communication, or which may include rate-matching the PUSCH communication around the UCI bits of the PUCCH communication. Such multiplexing may conserve network resources due to fewer transmissions, may reduce latency by avoiding transmission delays, and/or the like.

However, in some cases, the UE may not have sufficient time to process the PUSCH communication and/or the PUCCH communication in order to perform such multiplexing. In this case, the UE may not be capable of performing such multiplexing, which may result in decoding errors at a base station if the base station and the UE do not apply the same rules to multiplexing. Techniques and apparatuses described herein permit the UE and the base station to apply a consistent set of rules to PUSCH and PUCCH multiplexing, thereby reducing errors, achieving performance improvements when such multiplexing is possible, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a UE 120 may selectively multiplex one or more communications, and the base station 110 may decode received signals based at least in part on whether the communications were multiplexed, as described in more detail elsewhere herein.

As indicated above, FIG. 1 is provided merely as an example. Other examples are possible and may differ from what was described with regard to FIG. 1.

Figure 2:
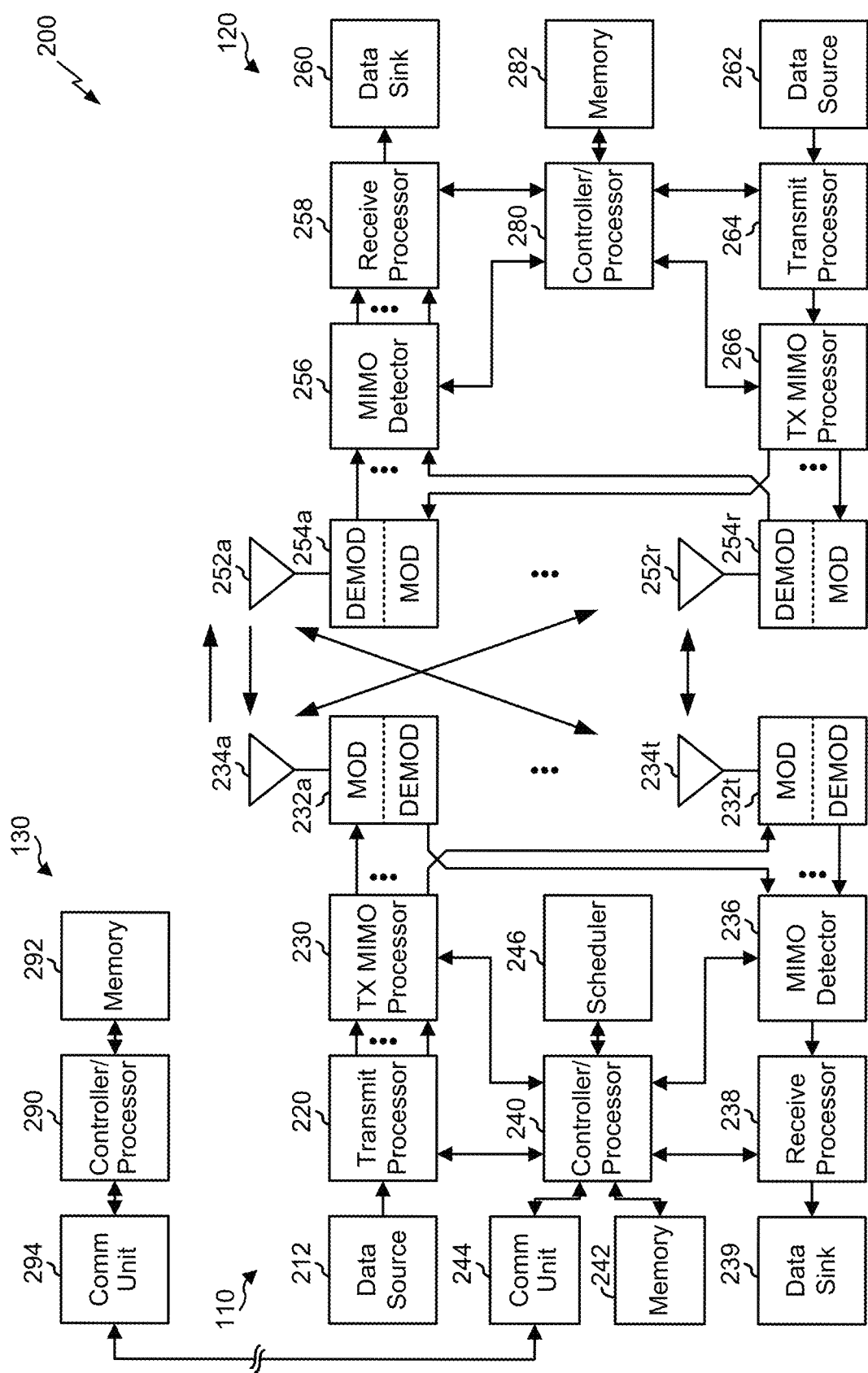
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with selectively multiplexing PUSCH and PUCCH communications, as described in more detail elsewhere herein. For example, controller/processor 240 of base station 110, controller/processor 280 of UE 120, and/or any other component(s) of FIG. 2 may perform or direct operations of, for example, process 1300 of FIG. 13, process 1400 of FIG. 14, and/or other processes as described herein. Memories 242 and 282 may store data and program codes for base station 110 and UE 120, respectively. A scheduler 246 may schedule UEs for data transmission on the downlink and/or uplink.

Figure 13:
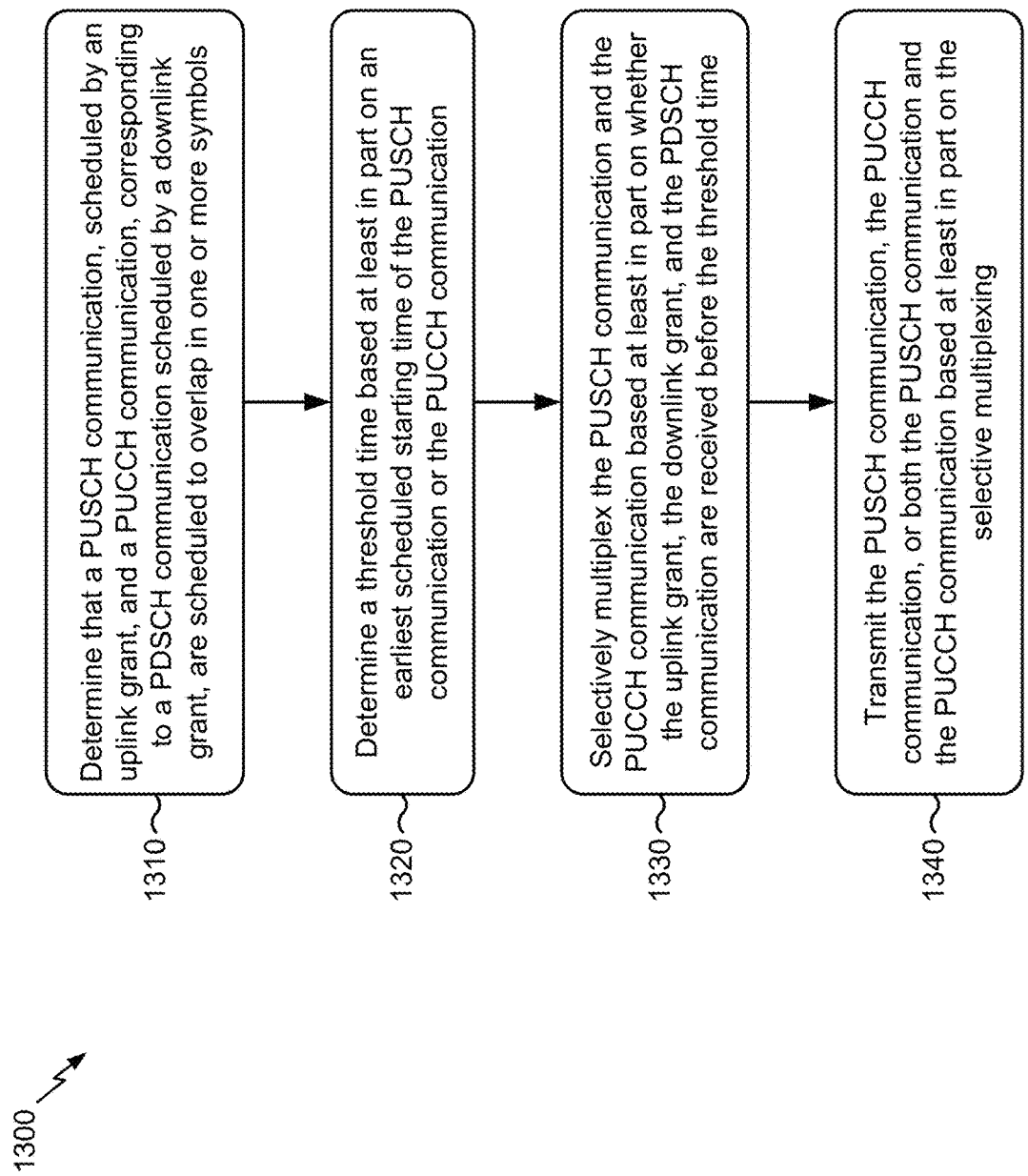
FIG. 13 is a diagram illustrating an example process performed, for example, by a user equipment, in accordance with various aspects of the present disclosure.

The stored program codes, when executed by processor 280 and/or other processors and modules at UE 120, may cause the UE 120 to perform operations described with respect to process 1300 of FIG. 13 and/or other processes as described herein. The stored program codes, when executed by processor 240 and/or other processors and modules at base station 110, may cause the base station 110 to perform operations described with respect to process 1400 of FIG. 14 and/or other processes as described herein. A scheduler 246 may schedule UEs for data transmission on the downlink and/or uplink.

In some aspects, UE 120 may include means for determining that a PUSCH communication, scheduled by an uplink grant, and a PUCCH communication, corresponding to a PDSCH communication scheduled by a downlink grant, are scheduled to overlap in one or more symbols; means for determining a threshold time based at least in part on an earliest scheduled starting time of the PUSCH communication or the PUCCH communication; means for selectively multiplexing the PUSCH communication and the PUCCH communication based at least in part on whether the uplink grant, the downlink grant, and the PDSCH communication are received before the threshold time; means for transmitting the PUSCH communication, the PUCCH communication, or both the PUSCH communication and the PUCCH communication based at least in part on the selective multiplexing; and/or the like. In some aspects, such means may include one or more components of UE 120 described in connection with FIG. 2.

In some aspects, base station 110 may include means for determining that a PUSCH communication, scheduled by an uplink grant, and a PUCCH communication, corresponding to a PDSCH communication scheduled by a downlink grant, are scheduled to overlap in one or more symbols; means for determining a threshold time based at least in part on an earliest scheduled starting time of the PUSCH communication or the PUCCH communication; means for decoding one or more signals, received in the one or more symbols, based at least in part on whether the uplink grant, the downlink grant, and the PDSCH communication are transmitted before the threshold time; and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples are possible and may differ from what was described with regard to FIG. 2.

Figure 3A:
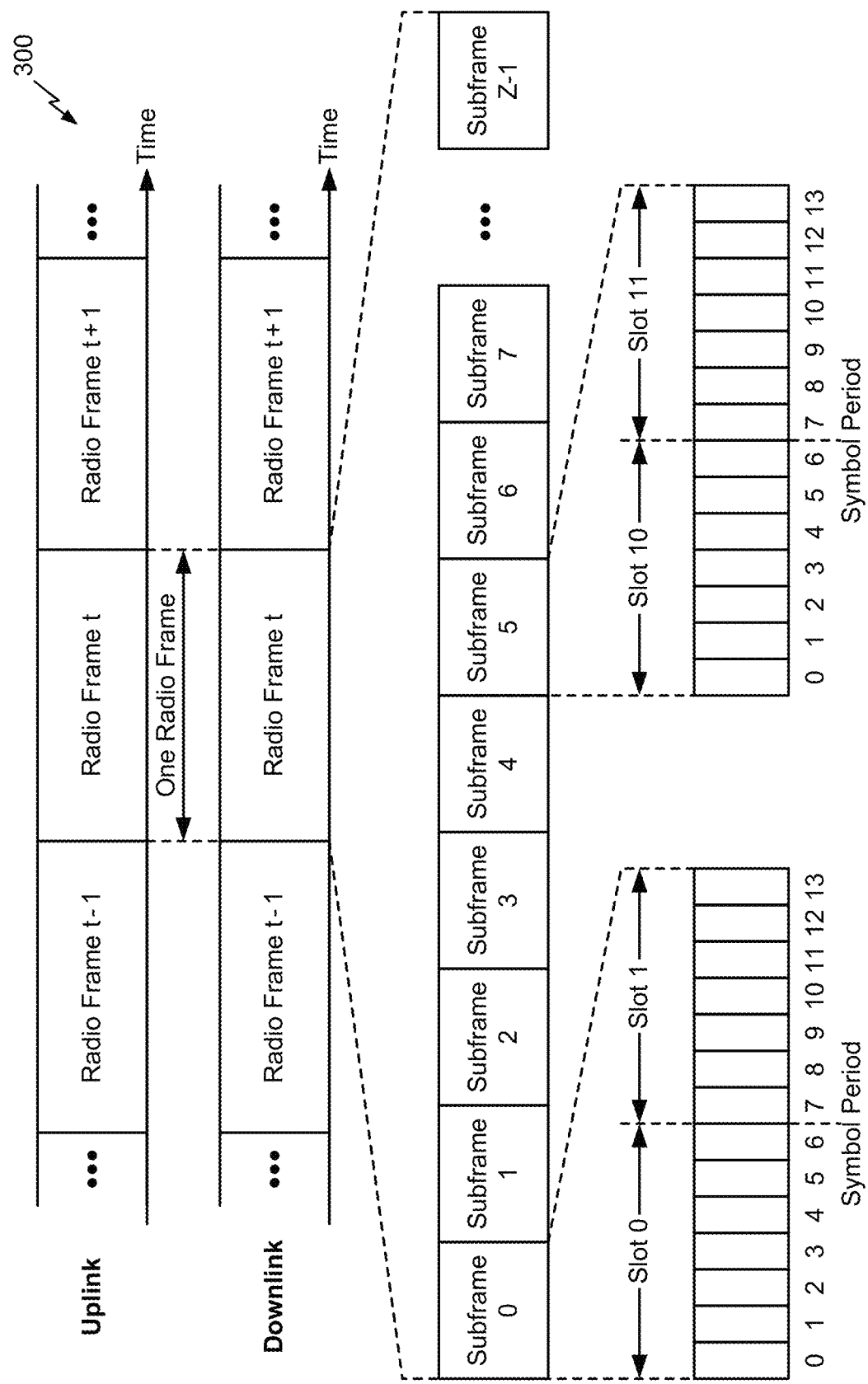
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
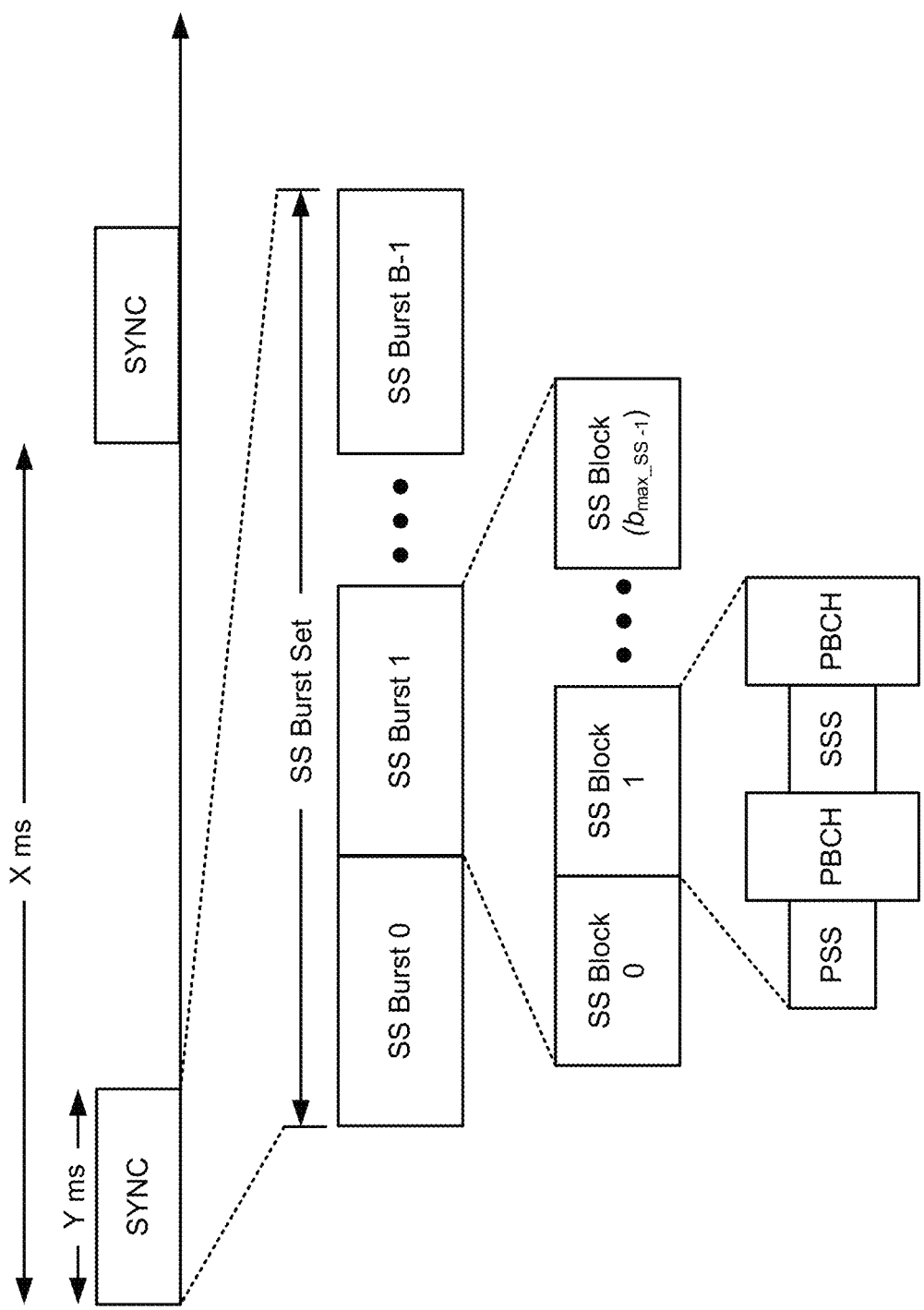
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

The base station may transmit system information, such as system information blocks (SIBs) on a physical downlink shared channel (PDSCH) and/or a physical downlink control channel (PDCCH) in certain subframes. The base station may transmit control information/data on a PDCCH in C symbol periods of a subframe, where B may be configurable for each subframe. The base station may transmit traffic data and/or other data on the PDSCH and/or the PDCCH in the remaining symbol periods of each subframe.

As indicated above, FIGS. 3A and 3B are provided as examples. Other examples are possible and may differ from what was described with regard to FIGS. 3A and 3B.

Figure 4:
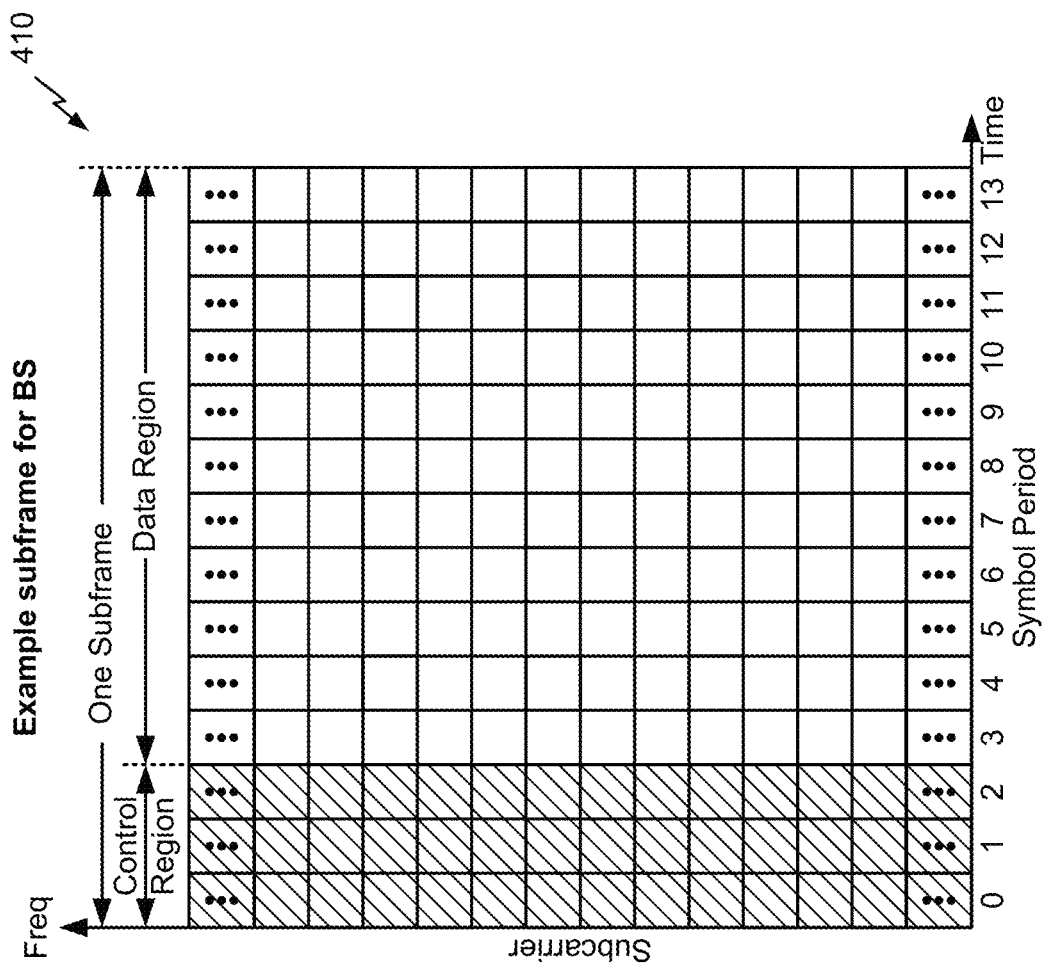
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
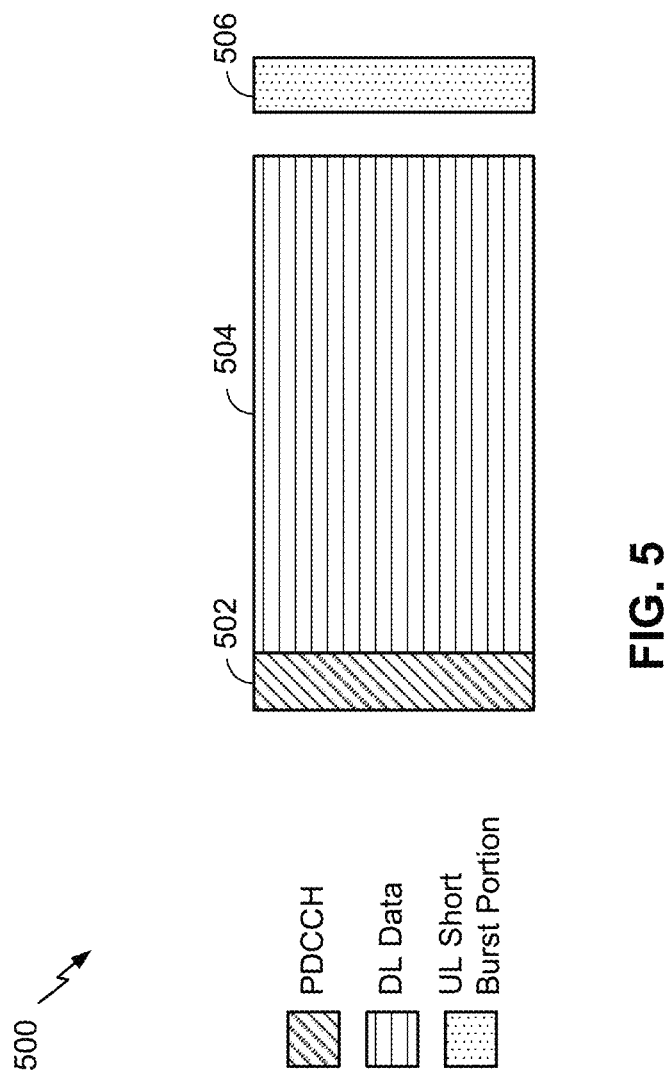
FIG. 5 is a diagram illustrating an example of a downlink (DL)-centric slot, in accordance with various aspects of the present disclosure.

FIG. 5 is a diagram 500 showing an example of a DL-centric slot, subframe, or other wireless communication structure or transmission time interval (TTI) (referred to in connection with FIG. 5 as a DL-centric subframe). The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like.

The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric subframe. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples are possible and may differ from what was described with regard to FIG. 5.

Figure 6:
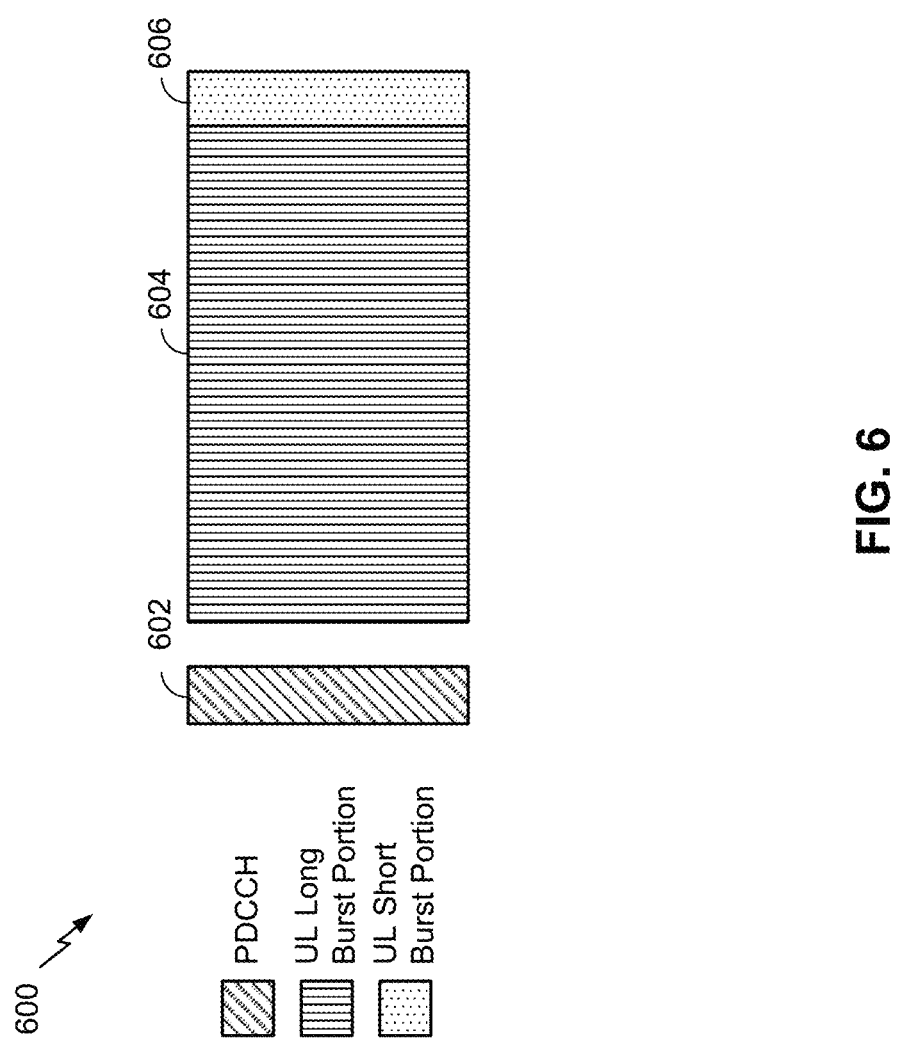
FIG. 6 is a diagram illustrating an example of an uplink (UL)-centric slot, in accordance with various aspects of the present disclosure.

FIG. 6 is a diagram 600 showing an example of an UL-centric slot, subframe, or other wireless communication structure or transmission time interval (TTI) (referred to in connection with FIG. 6 as an UL-centric subframe). The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL long burst portion 604. The UL long burst portion 604 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 6 is provided merely as an example. Other examples are possible and may differ from what was described with regard to FIG. 6.

In a wireless communication system, such as 5G, a UE 120 may multiplex communications on different physical channels. For example, the UE 120 may multiplex a PUCCH communication (e.g., that includes uplink control information (UCI), such as acknowledgment or negative acknowledgement (ACK/NACK) feedback and/or the like) and a PUSCH communication. In some aspects, the UE 120 may multiplex the PUCCH communication and the PUSCH communication by piggybacking the PUCCH communication in the PUSCH communication, which may include puncturing (e.g., dropping) one or more bits of the PUSCH communication and replacing the punctured PUSCH bit(s) with bit(s) of the PUCCH communication and/or which may include rate-matching one or more bits of the PUSCH communication around UCI bits of the PUCCH communication. Such multiplexing may conserve network resources due to fewer transmissions, may reduce latency by avoiding transmission delays, and/or the like.

However, in some cases, the UE 120 may not have sufficient time to process the PUSCH communication and/or the PUCCH communication in order to perform such multiplexing. In this case, the UE 120 may not be capable of performing such multiplexing, which may result in decoding errors at the base station 110 if the base station 110 and the UE 120 do not apply the same rules to multiplexing. Techniques and apparatuses described herein permit the UE 120 and the base station 110 to apply a consistent set of rules to PUSCH and PUCCH multiplexing, thereby reducing errors, achieving performance improvements when such multiplexing is possible, and/or the like.

Figure 7:
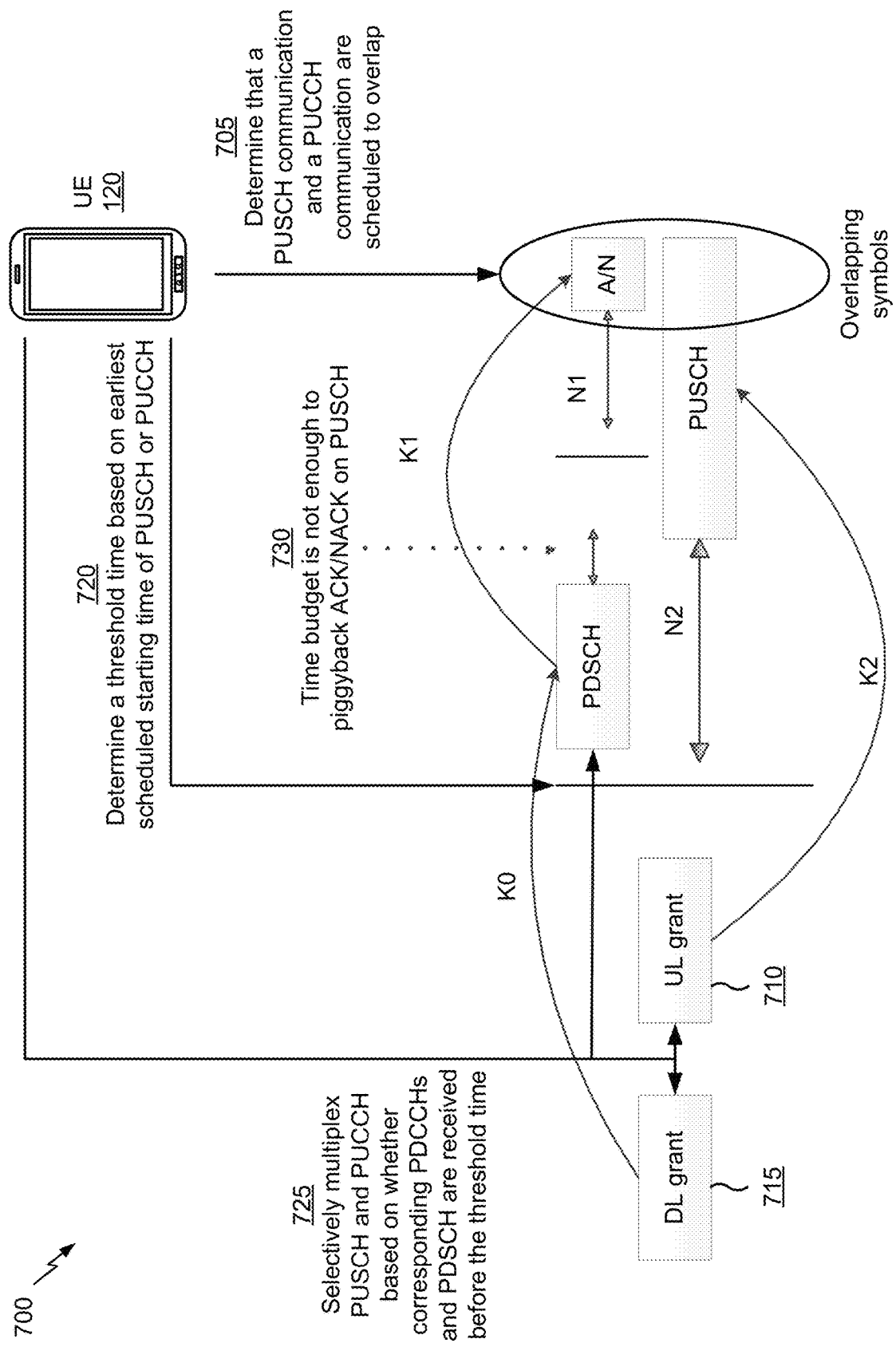
FIGS. 7-12 are diagrams illustrating examples of selectively multiplexing PUSCH and PUCCH communications, in accordance with various aspects of the present disclosure.

FIG. 7 is a diagram illustrating an example 700 of selectively multiplexing PUSCH and PUCCH communications, in accordance with various aspects of the present disclosure.

As shown by reference number 705, a UE 120 may determine that a PUSCH communication and a PUCCH communication are scheduled to overlap in one or more symbols. For example, a PUSCH communication may cross a boundary of an UL long burst portion 604 (described above in connection with FIG. 6) and may be scheduled to occur in one or more symbols of an UL short burst portion 606 in which the PUCCH communication is scheduled. In some aspects, the UE 120 may make this determination based at least in part on scheduling information received in PDCCH communications that schedule the PUSCH communication and the PUCCH communication (e.g., using downlink control information (DCI)). Additionally, or alternatively, the UE 120 may make this determination based at least in part on scheduling information received in connection with semi-persistent scheduling, configured scheduling, and/or the like (e.g., using DCI and/or a radio resource control (RRC) message).

In some aspects, the PUSCH communication and the PUCCH communication may be included in the same PUCCH group. For example, the PUSCH communication and the PUCCH communication may be transmitted on the same carrier (e.g., component carrier). As another example, the PUSCH communication and the PUCCH communication may be transmitted on different carriers that are included in the same PUCCH group. A PUCCH group may refer to a group of carriers that includes a primary carrier and one or more secondary carriers. The primary carrier may be used for all PUCCH communications for the PUCCH group. In this case, frequency division multiplexing of the PUSCH communication and the PUCCH communication is not possible, and multiplexing of the PUSCH communication and the PUCCH communication may be achieved by piggybacking the PUCCH communication in the PUSCH communication. In some aspects, piggybacking may refer to puncturing the PUSCH communication with the PUCCH communication by replacing one or more bits of the PUSCH communication with one or more bits of the PUCCH communication. In some aspects, piggybacking may refer to rate-matching the PUSCH communication around the uplink control information (UCI) bits corresponding to the PUCCH communication. In this way, UCI of the PUCCH communication may be transmitted on the PUSCH.

As shown by reference number 710, the PUSCH communication may be scheduled by a PDCCH communication that includes an uplink grant. For example, the uplink grant may indicate a timing between the PDCCH communication and transmission of the PUSCH communication scheduled by the PDCCH communication (e.g., which may be referred to as a K2 value in the 3GPP specification).

As shown by reference number 715, the PUCCH communication may be scheduled by a PDCCH communication that includes a downlink grant. For example, the downlink grant may indicate a timing between the PDCCH communication and a PDSCH communication scheduled by the PDCCH communication (e.g., which may be referred to as a K0 value in the 3GPP specification), and may indicate a timing between the PDSCH communication and a corresponding PUCCH communication that includes ACK/NACK feedback for the PDSCH communication (e.g., which may be referred to as a K1 value in the 3GPP specification). The timing may indicate, for example, a number of slots, a number of uplink opportunities, a number of PDSCH opportunities, a number of PUCCH opportunities, and/or the like.

As shown by reference number 720, the UE 120 may determine a threshold time (e.g., a threshold symbol, a threshold symbol boundary, and/or the like) based at least in part on an earliest scheduled starting time of the PUSCH communication or the PUCCH communication. In some aspects, the PUSCH communication and the PUCCH communication may be scheduled to start in a same symbol, in which case the earliest scheduled starting time may be that same symbol.

Alternatively, the PUSCH communication and the PUCCH communication may be scheduled to start in different symbols, in which case the earliest scheduled starting time may be the initial symbol of whichever one of the PUSCH communication or the PUCCH communication that starts in an earlier symbol. For example, if the PUSCH communication is scheduled to start in an earlier symbol than the PUCCH communication, then the earliest scheduled starting time may be a scheduled starting time of the PUSCH communication. Conversely, if the PUCCH communication is scheduled to start in an earlier symbol than the PUSCH communication, then the earliest scheduled starting time may be a scheduled starting time of the PUCCH communication.

In some aspects, the UE 120 may determine the threshold time based at least in part on a PUSCH processing time (e.g., which may be referred to as an N2 value in the 3GPP specification). In some aspects, the PUSCH processing time may be a minimum processing time required to process a PUSCH communication prior to transmission by the UE 120. Additionally, or alternatively, the UE 120 may determine the threshold time based at least in part on a PUCCH processing time (e.g., which may be referred to as an N1 value in the 3GPP specification). In some aspects, the PUCCH processing time may be a minimum processing time required to process a PUCCH communication prior to transmission by the UE 120. Additional details are described below in connection with FIGS. 9 and 10.

As shown by reference number 725, the UE 120 may selectively multiplex (e.g., multiplex or not multiplex) the PUSCH communication and the PUCCH communication based at least in part on whether the uplink grant, the downlink grant, and a PDSCH communication, corresponding to the PUCCH communication, are received before the threshold time. As described elsewhere herein, such multiplexing may include piggybacking uplink control information of the PUCCH communication in the PUSCH communication by puncturing the PUSCH communication and/or by rate-matching the PUSCH communication around the UCI bits of the PUCCH communication.

In some aspects, the UE 120 may multiplex the PUSCH communication and the PUCCH communication based at least in part on a determination that the uplink grant, the downlink grant, and a last symbol (e.g., at least a last symbol, and possibly one or more other symbols) of the PDSCH communication are received before the threshold time. In this case, when all of these communications are received before the threshold time, then the UE 120 may have sufficient time to process the PUSCH communication and the PUCCH communication to permit such multiplexing. In this way, the UE 120 may conserve network resources, reduce latency, and/or the like due to such multiplexing.

In some aspects, the UE 120 may prevent multiplexing of the PUSCH communication and the PUCCH communication based at least in part on a determination that at least one of the uplink grant, the downlink grant, or a last symbol of the PDSCH communication is received after the threshold time. In this case, the UE 120 may not have sufficient time to process the PUSCH communication and the PUCCH communication to permit such multiplexing, and may prevent such multiplexing from occurring to reduce errors (e.g., decoding errors at a base station 110 that receives the signal(s) transmitted by the UE 120 in the overlapping symbols).

For example, as shown in example 700 and by reference number 730, if the downlink grant and the uplink grant are received before the threshold time, but one or more symbols of the PDSCH communication are received after the threshold time, then the UE 120 may not have sufficient time to piggyback the PUCCH communication (e.g., ACK/NACK feedback) in the PUSCH communication.

In some aspects, the UE 120 may drop both the PUSCH communication and the PUCCH communication based at least in part on a determination that at least one of the uplink grant, the downlink grant, or a last symbol of the PDSCH communication is received after the threshold time. For example, this situation may not be permitted (e.g., by a 3GPP specification), and if such a situation occurs, then the UE 120 may be configured to indicate an error and/or drop both the PUSCH communication and the PUCCH communication.

Alternatively, the UE 120 may transmit only one of either the PUSCH communication or the PUCCH communication, and may drop the other of the PUSCH communication of the PUCCH communication, based at least in part on a determination that at least one of the uplink grant, the downlink grant, or a last symbol of the PDSCH communication is received after the threshold time. For example, if these communications are not received before the threshold time, then the UE 120 may transmit the PUSCH communication, and may drop the PUCCH communication. Alternatively, if these communications are not received before the threshold time, then the UE 120 may transmit the PUCCH communication, and may drop the PUSCH communication.

In some aspects, the UE 120 may transmit the communication (e.g., the PUSCH communication or the PUCCH communication) that is scheduled to start in an earlier symbol, and may drop the communication that is scheduled to start in a later symbol. Alternatively, the UE 120 may transmit the communication that is scheduled to start in a later symbol, and may drop the communication that is scheduled to start in an earlier symbol.

In some aspects, the UE 120 may receive an indication from a base station 110 (e.g., in an RRC message, DCI, and/or the like) of which communication is to be transmitted and which communication is to be dropped (e.g., the PUSCH communication, the PUCCH communication, the communication that starts in the earlier symbol, the communication that starts in the later symbol, and/or the like). In this way, the UE 120 may be flexibly configured for different requirements (e.g., a latency requirement, a reliability requirement, and/or the like), different types of operations (e.g., URLLC, eMBB), different loads on the base station 110, different channel conditions, and/or the like.

Although FIG. 7 shows selective multiplexing of a single PUSCH communication and a single PUCCH communication, in some aspects, the UE 120 may selectively multiplex a single PUSCH communication and multiple PUCCH communications, may selectively multiplex multiple PUSCH communications and a single PUCCH communication, or may selectively multiplex multiple PUSCH communications and multiple PUCCH communications. Additional details are described below in connection with FIGS. 11 and 12.

By piggybacking a PUCCH communication in a PUSCH communication when the UE 120 has sufficient time to perform such piggybacking, the UE 120 may conserve network resources, reduce latency, and/or the like. Furthermore, by preventing such piggybacking from occurring when the UE 120 does not have sufficient time to perform such piggybacking, the UE 120 may reduce and/or prevent errors.

As indicated above, FIG. 7 is provided as an example. Other examples are possible and may differ from what was described with respect to FIG. 7.

Figure 8:
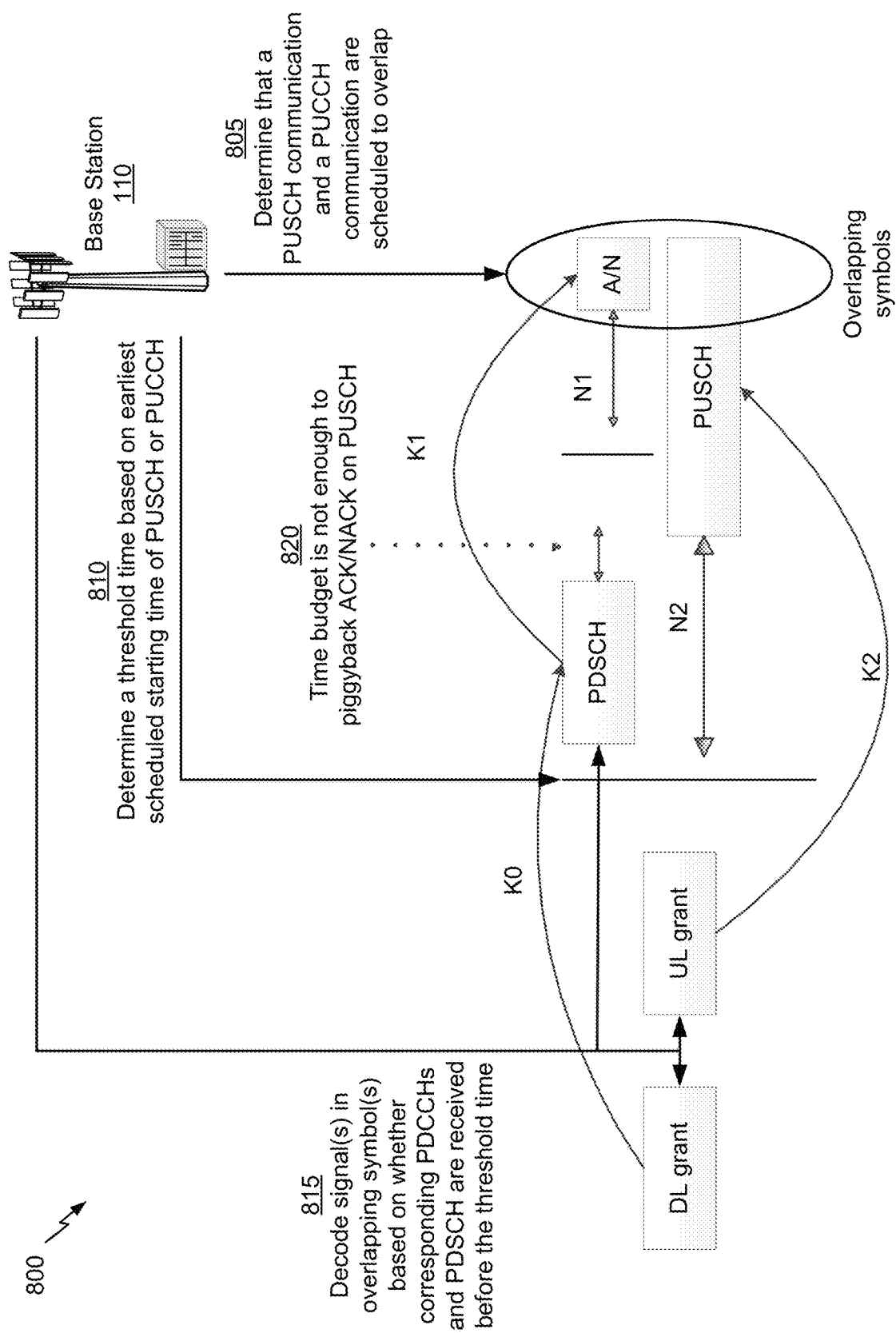

FIG. 8 is a diagram illustrating another example 800 of selectively multiplexing PUSCH and PUCCH communications, in accordance with various aspects of the present disclosure.

As shown by reference number 805, a base station 110 may determine that a PUSCH communication and a PUCCH communication are scheduled to overlap in one or more symbols, in a similar manner as described above in connection with FIG. 7. In some aspects, the base station 110 may make this determination based at least in part on scheduling information transmitted in PDCCH communications that schedule the PUSCH communication and the PUCCH communication (e.g., using downlink control information (DCI)). Additionally, or alternatively, the base station 110 may make this determination based at least in part on scheduling information transmitted in connection with semi-persistent scheduling, configured scheduling, and/or the like (e.g., using DCI and/or a radio resource control (RRC) message).

In some aspects, the PUSCH communication and the PUCCH communication may be included in the same PUCCH group, as described above in connection with FIG. 7. In some aspects, the PUSCH communication may be scheduled by a PDCCH communication that includes an uplink grant, as described above in connection with FIG. 7. Additionally, or alternatively, the PUCCH communication may be scheduled by a PDCCH communication that includes a downlink grant, as described above in connection with FIG. 7.

As shown by reference number 810, the base station 110 may determine a threshold time based at least in part on an earliest scheduled starting time of the PUSCH communication or the PUCCH communication, as described above in connection with FIG. 7. In some aspects, the base station 110 may determine the threshold time based at least in part on a PUSCH processing time and/or a PUCCH processing time, as described above in connection with FIG. 7. Additional details regarding determining the threshold time are described below in connection with FIGS. 9 and 10. In some aspects, the PUSCH processing time and/or the PUCCH processing time for the UE 120 may be indicated by the UE 120 to the base station 110 (e.g., in an RRC message, in a capability report, and/or the like).

As shown by reference number 815, the base station 110 may decode one or more signals (e.g., at least a portion of only the PUSCH communication, only the PUCCH communication, or both the PUSCH communication and the PUCCH communication) based at least in part on whether the uplink grant, the downlink grant, and a PDSCH communication, corresponding to the PUCCH communication, are transmitted before the threshold time and/or are scheduled to be received by the UE 120 before the threshold time.

In some aspects, the UE 120 may multiplex the PUSCH communication and the PUCCH communication based at least in part on a determination that the uplink grant, the downlink grant, and a last symbol (e.g., at least a last symbol, and possibly one or more other symbols) of the PDSCH communication are received by the UE 120 before the threshold time. In this case, when all of these communications are transmitted by the base station 110 before the threshold time, then the base station 110 may assume such multiplexing when decoding the one or more symbols. In this way, the UE 120 and the base station 110 may conserve network resources, reduce latency, and/or the like due to such multiplexing.

In some aspects, the UE 120 may prevent multiplexing of the PUSCH communication and the PUCCH communication based at least in part on a determination that at least one of the uplink grant, the downlink grant, or a last symbol of the PDSCH communication is received by the UE 120 after the threshold time. In this case, when all of these communications are not transmitted by the base station 110 before the threshold time, then the base station 110 may assume that the PUSCH communication and the PUCCH communication are not multiplexed when decoding the one or more symbols. In this way, decoding errors may be reduced, which may conserve processing and memory resources.

For example, as shown in example 800 and by reference number 820, if the downlink grant and the uplink grant are transmitted before the threshold time, but one or more symbols of the PDSCH communication are transmitted after the threshold time, then the UE 120 may not have sufficient time to piggyback the PUCCH communication (e.g., ACK/NACK feedback) in the PUSCH communication, and the base station 110 may decode signal(s) received in the overlapping symbol(s) accordingly.

In some aspects, the UE 120 may drop both the PUSCH communication and the PUCCH communication. In this case, the base station 110 may ignore (e.g., skip decoding of) one or more signals received in the one or more symbols.

Alternatively, the UE 120 may transmit only one of either the PUSCH communication or the PUCCH communication, and may drop the other of the PUSCH communication of the PUCCH communication. Additionally, or alternatively, the UE 120 may transmit only one of either the communication that is scheduled to start in an earlier symbol or the communication that is scheduled to start in a later symbol, and may drop the other of the communication that is scheduled to start in the earlier symbol or the communication that is scheduled to start in the later symbol. In either case, the base station 110 may decode and/or interpret signal(s) received in the overlapping symbol(s) based at least in part on a determination of which communication is transmitted by the UE 120.

In some aspects, the base station 110 and the UE 120 may both store information regarding which communication is to be transmitted. For example, such information may be hard coded in memory of the base station 110 and/or the UE 120 according to a 3GPP specification. Additionally, or alternatively, the base station 110 may transmit, to the UE 120, an indication of which communication is to be transmitted and which communication is to be dropped. In this way, the UE 120 may be flexibly configured for different requirements (e.g., a latency requirement, a reliability requirement, and/or the like), different types of operations (e.g., URLLC, eMBB), different loads on the base station 110, different channel conditions, and/or the like.

Although FIG. 8 describes decoding with respect to a single PUSCH communication and a single PUCCH communication, in some aspects, the base station 110 may decode with respect to a single PUSCH communication and multiple PUCCH communications, may decode with respect to multiple PUSCH communications and a single PUCCH communication, or may decode with respect to multiple PUSCH communications and multiple PUCCH communications. Additional details are described below in connection with FIGS. 11 and 12.

As indicated above, FIG. 8 is provided as an example. Other examples are possible and may differ from what was described with respect to FIG. 8.

Figure 9:
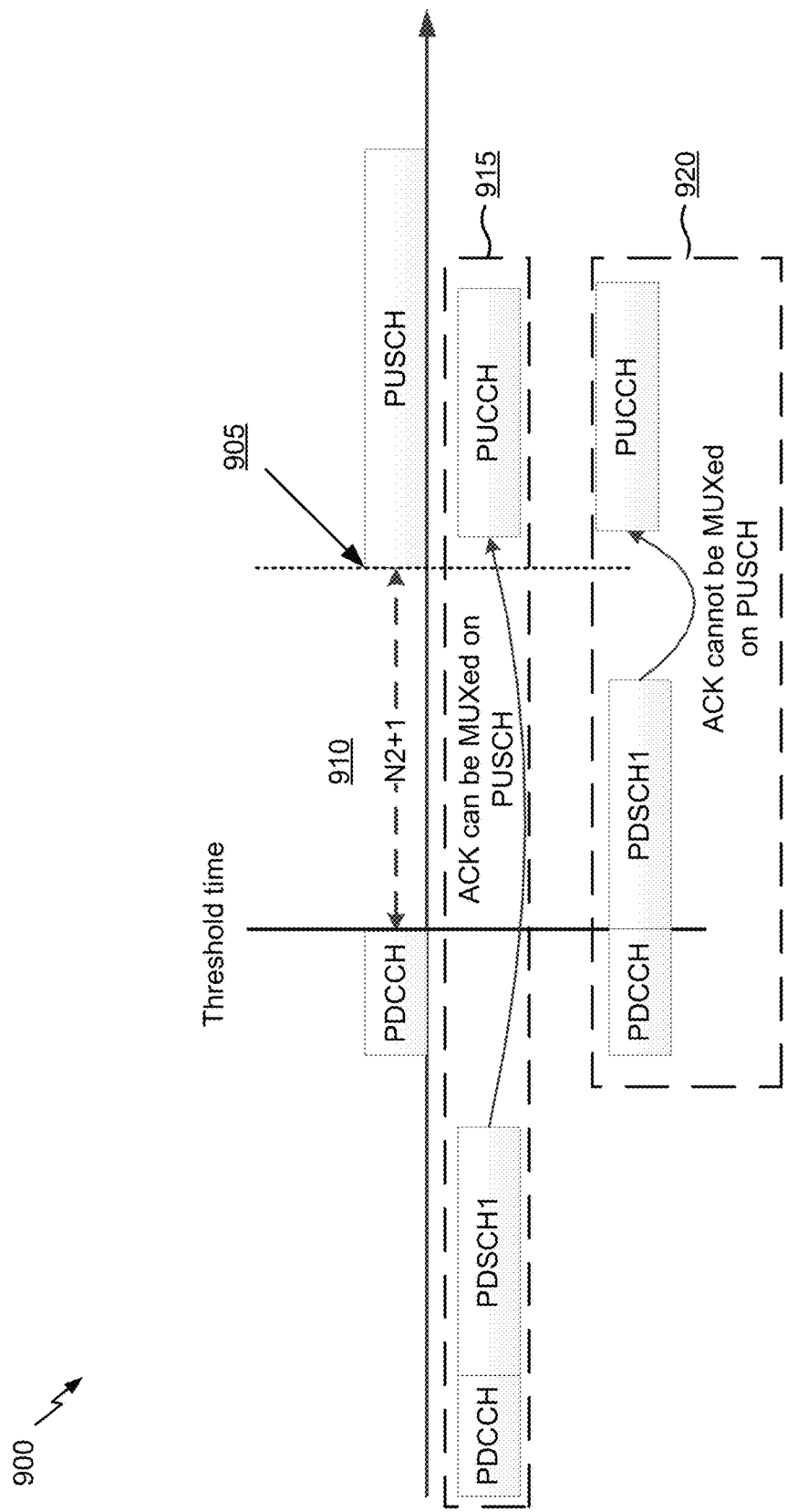

FIG. 9 is a diagram illustrating another example 900 of selectively multiplexing PUSCH and PUCCH communications, in accordance with various aspects of the present disclosure.

As shown by reference number 905, in some aspects, the PUSCH communication may be scheduled to start in an earlier symbol than the PUCCH communication. In this case, the UE 120 and/or the base station 110 may determine the threshold time based at least in part on a PUSCH processing time (e.g., N2) and/or a scheduled starting time of the PUSCH communication.

In some aspects, the threshold time may be computed as a threshold symbol (e.g., rather than a symbol boundary), and the PUSCH processing time may be N2 symbols in length. In this case, the threshold time may be N2+1 symbols before the initial symbol (e.g., the first symbol in time) of the PUSCH communication, as shown by reference number 910. In this case, if the threshold time is determined from the PUSCH processing time (e.g., because the PUSCH communication occurs first), then the downlink grant corresponding to the PUCCH communication and the last symbol of the PDSCH communication corresponding to the PUCCH communication should occur in or before a symbol that is N2+1 symbols before the initial symbol of the PUSCH communication in order to permit sufficient processing time for multiplexing.

For example, as shown by reference number 915, if the downlink grant and the last symbol of the PDSCH communication occur in or before a symbol that is N2+1 symbols before the initial symbol of the PUSCH communication, then this allows the UE 120 to process the PUSCH communication in the N2 symbols prior to the initial symbol of the PUSCH communication, and to multiplex the PUCCH communication with the PUSCH communication.

However, as shown by reference number 920, if the downlink grant or the last symbol of the PDSCH communication occur after a symbol that is N2+1 symbols before the initial symbol of the PUSCH communication, then this does not allow the UE 120 to process the PUSCH communication in the N2 symbols prior to the initial symbol of the PUSCH communication, and the UE 120 will not be capable of multiplexing the PUCCH communication with the PUSCH communication.

As indicated above, FIG. 9 is provided as an example. Other examples are possible and may differ from what was described with respect to FIG. 9.

Figure 10:
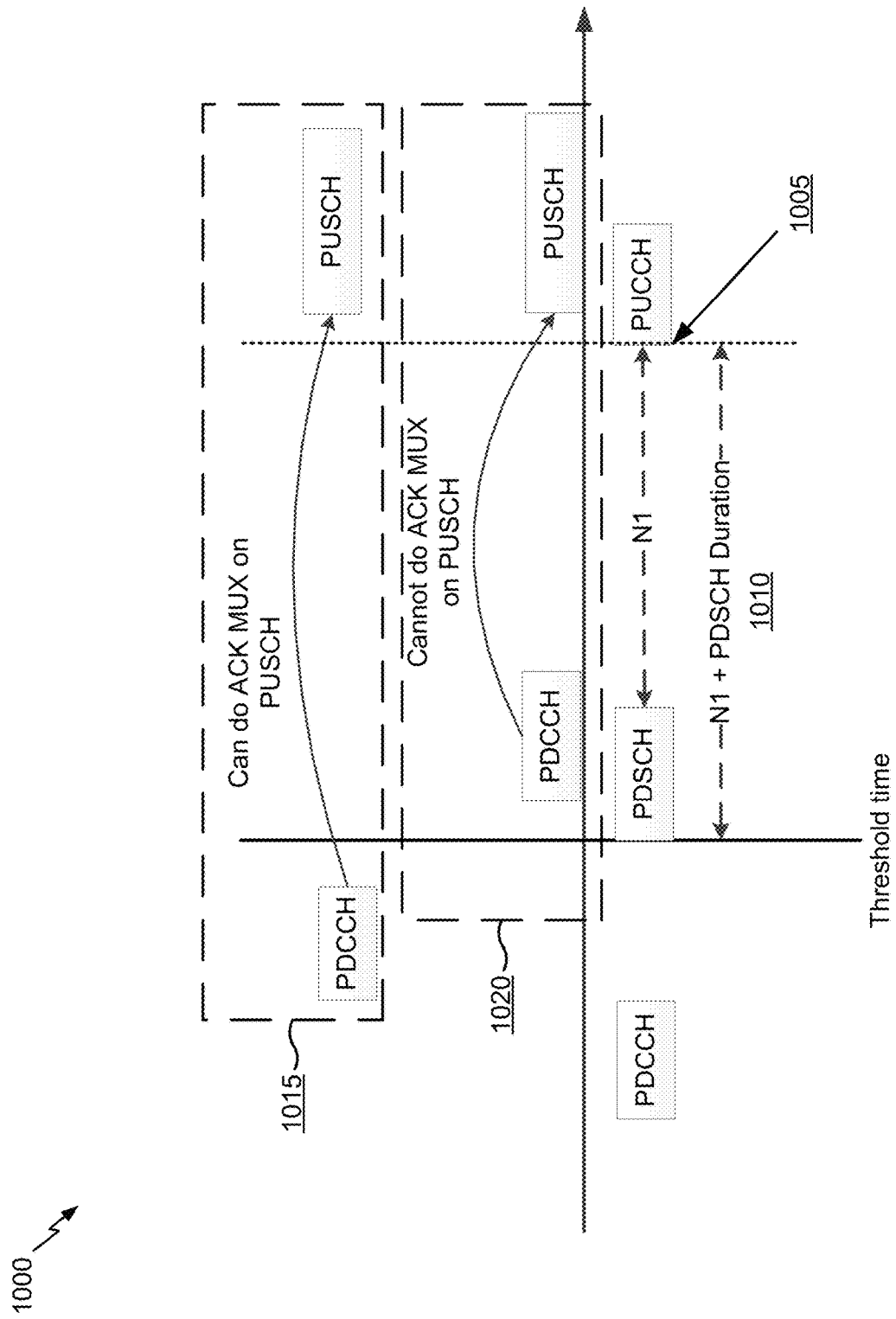

FIG. 10 is a diagram illustrating another example 1000 of selectively multiplexing PUSCH and PUCCH communications, in accordance with various aspects of the present disclosure.

As shown by reference number 1005, in some aspects, the PUCCH communication may be scheduled to start in an earlier symbol than the PUSCH communication. In this case, the UE 120 and/or the base station 110 may determine the threshold time based at least in part on a PUCCH processing time (e.g., N1), a duration of the PDSCH communication corresponding to the PUCCH communication (and/or a preconfigured default duration), and/or a scheduled starting time of the PUCCH communication.

In some aspects, the threshold time may be computed as a threshold symbol (e.g., rather than a symbol boundary), and the PUCCH processing time may be N1 symbols in length. In this case, the threshold time may be N1 symbols plus a number of symbols of the PDSCH communication before the initial symbol of the PUCCH communication, as shown by reference number 1010. In this case, if the threshold time is determined from the PUCCH processing time and/or the PDSCH duration (e.g., because the PUCCH communication occurs first), then the uplink grant corresponding to the PUSCH communication should occur in or before a symbol that is N1+$N_{PDSCH}$ symbols before the initial symbol of the PUCCH communication in order to permit sufficient processing time for multiplexing (e.g., where $N_{PDSCH}$ is the number of symbols in the PDSCH communication).

For example, as shown by reference number 1015, if the uplink grant occurs in or before a symbol that is N1+$N_{PDSCH}$ symbols before the initial symbol of the PUCCH communication, then this allows the UE 120 to process the PUCCH communication prior to the initial symbol of the PUCCH communication, and to multiplex the PUCCH communication with the PUSCH communication.

However, as shown by reference number 1020, if the uplink grant occurs after a symbol that is N1+$N_{PDSCH}$ symbols before the initial symbol of the PUCCH communication, then this does not allow the UE 120 to process the PUCCH communication prior to the initial symbol of the PUCCH communication, and the UE 120 will not be capable of multiplexing the PUCCH communication with the PUSCH communication.

In some aspects, the threshold time may be determined based at least in part on a preconfigured value (e.g., a preconfigured number of symbols). For example, the threshold time may be N1 symbols plus the preconfigured number of symbols before the initial symbol of the PUCCH communication. Additionally, or alternatively, the threshold time may be N1 symbols plus a maximum value between $N_{PDSCH}$ and the preconfigured number of symbols (e.g., max{$N_{PDSCH}$, $N_{preconfigured}$}) before the initial symbol of the PUCCH communication. This may permit sufficient processing time by using the PDSCH duration when the PDSCH is long, and by using the preconfigured value when the PDSCH is short. In some aspects, the preconfigured number of symbols may be 7 symbols (e.g., to permit sufficient processing time). Alternatively, the preconfigured number of symbols may be a different number of symbols (e.g., 6 symbols, 8 symbols, and/or the like).

In some aspects, the threshold time may be determined based at least in part on a determination of whether the PUSCH communication or the PUCCH communication is scheduled to start in an earlier symbol. For example, if the PUSCH communication is scheduled to start in an earlier symbol, then the threshold time may be determined based at least in part on a PUSCH processing time, as described above in connection with FIG. 9. Conversely, if the PUCCH communication is scheduled to start in an earlier symbol, then the threshold time may be determined based at least in part on a PUCCH processing time, as described above in connection with FIG. 10. In some aspects, if the PUSCH communication and the PUCCH communication start in the same symbol, then the threshold time may be determined as a maximum value of a first threshold time determined based at least in part on the PUSCH processing time and a second threshold time determined based at least in part on the PUCCH processing time.

In some aspects, the same threshold time may be used regardless of which of the PUSCH communication or the PUCCH communication is scheduled to start in an earlier symbol. In some aspects, the threshold time may be determined as a maximum value of the first threshold time and the second threshold time described above. For example, in some aspects, the threshold time may be computed as max{N2+1, N1+max{$N_{PDSCH}$, $N_{preconfigured}$}} (e.g., where $N_{preconfigured}$=7, as an example). Alternatively, in some aspects, the first threshold time (e.g., N2+1) may be used regardless of which of the PUSCH communication or the PUCCH communication is scheduled to start in an earlier symbol. In some aspects, the second threshold time (e.g., N1+max{$N_{PDSCH}$, $N_{preconfigured}$}) may be used regardless of which of the PUSCH communication or the PUCCH communication is scheduled to start in an earlier symbol.

As indicated above, FIG. 10 is provided as an example. Other examples are possible and may differ from what was described with respect to FIG. 10.

Figure 11:
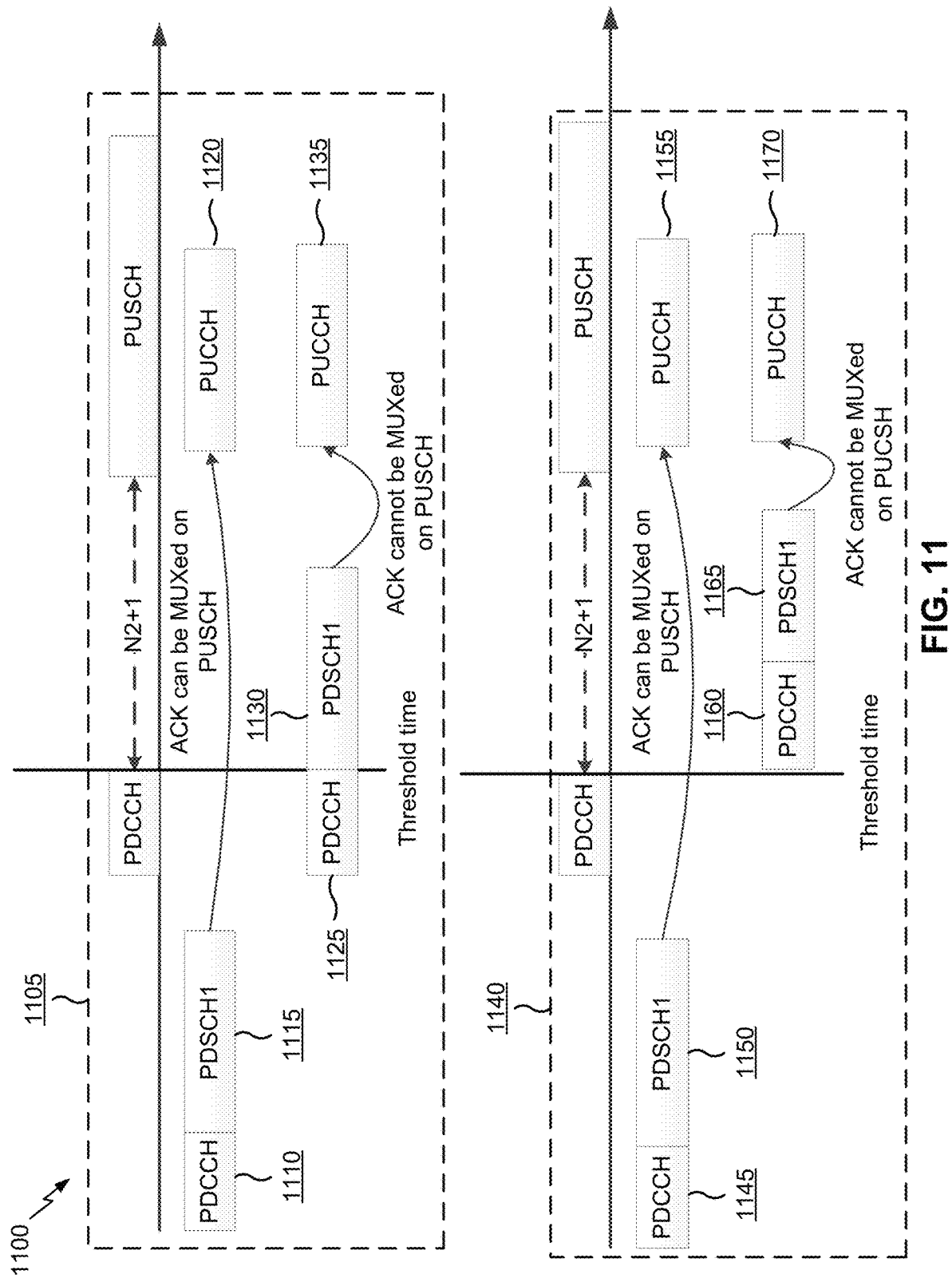

FIG. 11 is a diagram illustrating another example 1100 of selectively multiplexing PUSCH and PUCCH communications, in accordance with various aspects of the present disclosure.

In some aspects, the UE 120 may determine that there are multiple PUCCH communications to be potentially (e.g., selectively) multiplexed with a PUSCH communication (e.g., that overlap with one or more symbols of the PUSCH communication). In some aspects, the PUSCH communication may start in an earlier symbol than all of the multiple PUCCH communications. In this case, if all of the PDSCH communications corresponding to the PUCCH communications are received before the threshold time, then the UE 120 may multiplex ACK/NACK feedback, for the multiple PDSCH communications, in the PUSCH communication.

However, in some aspects, a first PDSCH communication may be received before the threshold time and at least a last symbol of a second PDSCH communication may be received after the threshold time. In this case, the UE 120 may be able to multiplex a first PUCCH communication (e.g., first ACK/NACK feedback), corresponding to the first PDSCH communication, but may not be able to multiplex a second PUCCH communication (e.g., second ACK/NACK feedback) corresponding to the second PDSCH communication.

As shown by reference number 1105, in some aspects, a first downlink grant 1110 may schedule a first PDSCH communication 1115 and a first PUCCH communication 1120. As shown, the first downlink grant 1110 and a last symbol of the first PDSCH communication 1115 are received before the threshold time. As further shown, a second downlink grant 1125, that schedules a second PDSCH communication 1130 and a second PUCCH communication 1135, may be received before the threshold time, and a last symbol of the second PDSCH communication 1130 may be received after the threshold time.

In some aspects, the UE 120 may multiplex a NACK, corresponding to the second PUCCH communication 1135, with the PUSCH communication and the first PUCCH communication 1120 based at least in part on a determination that the second downlink grant 1125 is received before the threshold time and that a last symbol of the second PDSCH communication 1130 is received after the threshold time. In this case, the UE 120 may be configured to use a downlink assignment index (DAI), indicated in the second downlink grant 1125, for multiplexing of ACK/NACK feedback. For example, the UE 120 may multiplex the NACK because the UE 120 does not have sufficient processing time to determine whether the second PDSCH communication 1130 is to be ACKed or NACKed. If the UE 120 successfully receives the second PDSCH communication 1130, then the UE 120 may ignore (e.g., skip decoding of) a retransmission of the second PDSCH communication 1130 triggered by the NACK, thereby saving energy of the UE 120.

Alternatively, the UE 120 may drop the second PUCCH communication 1135 based at least in part on a determination that the second downlink grant 1125 is received before the threshold time and that a last symbol of the second PDSCH communication 1130 is received after the threshold time. In this case, the UE 120 may be configured to use a DAI, indicated in the first downlink grant 1110, for multiplexing of ACK/NACK feedback. In this way, reliability may be improved by preventing the PUSCH communication from being punctured with a NACK without a determination of whether the NACK or an ACK should be transmitted.

In some aspects, the UE 120 may multiplex an ACK, corresponding to the second PUCCH communication 1135, with the PUSCH communication and the first PUCCH communication 1120 based at least in part on a determination that a PDCCH communication (e.g., which may or may not include the downlink grant 1125), that schedules the second PUCCH communication 1135, is received before the threshold time and that the PDCCH communication does not schedule a PDSCH communication. For example, in some aspects, the PDCCH communication may be used to signal bandwidth part switching, to active or deactivate (e.g., release) a configuration (e.g., semi-persistent scheduling, configured scheduling, and/or the like), and/or for another purpose other than scheduling a PDSCH communication. In this case, the UE 120 may multiplex an ACK of the PDCCH communication if the PDCCH communication is successfully received, or may multiplex a NACK of the PDCCH communication if the PDCCH communication is not successfully received.

As shown by reference number 1140, in some aspects, a first downlink grant 1145 may schedule a first PDSCH communication 1150 and a first PUCCH communication 1155. As shown, the first downlink grant 1145 and a last symbol of the first PDSCH communication 1150 are received before the threshold time. As further shown, a second downlink grant 1160, that schedules a second PDSCH communication 1165 and a second PUCCH communication 1170, may be received after the threshold time.

In some aspects, the UE 120 may drop the second PUCCH communication 1170 based at least in part on a determination that the second downlink grant 1160 is received after the threshold time. In this case, the UE 120 may be configured to use a DAI, indicated in the first downlink grant 1145, for multiplexing of ACK/NACK feedback. In this way, reliability may be improved by preventing the PUSCH communication from being punctured with the second PUCCH communication without a determination of whether the second PUCCH communication should include an ACK or a NACK.

While operations of FIG. 11 are described in connection with a UE 120, similar operations may be performed by a base station 110, in a similar manner as described above in connection with FIG. 8. In some aspects, the base station 110 and the UE 120 may store a same set of rules regarding handling of ACK/NACK feedback so that ACK/NACK feedback transmitted by the UE 120 may be appropriately decoded and/or interpreted by the base station 110. In some aspects, one or more of these rules may be hard coded in memory of the base station 110 and/or the UE 120 (e.g., based at least in part on a 3GPP specification). Additionally, or alternatively, one or more of these rules may be indicated to the UE 120 by the base station 110 (e.g., in an RRC message, in DCI, and/or the like). In this way, the UE 120 may be flexibly configured.

As indicated above, FIG. 11 is provided as an example. Other examples are possible and may differ from what was described with respect to FIG. 11.

Figure 12:
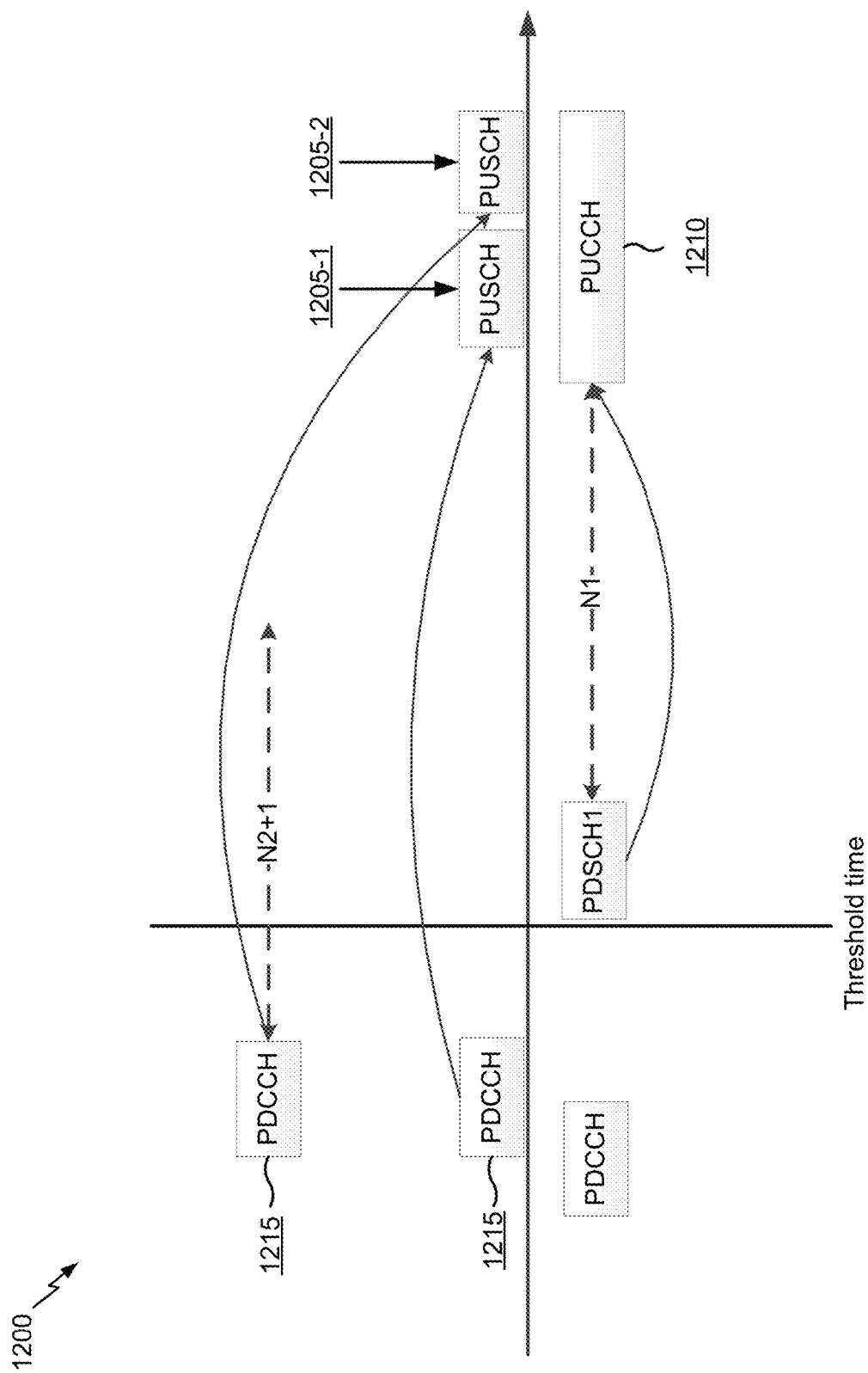

FIG. 12 is a diagram illustrating another example 1200 of selectively multiplexing PUSCH and PUCCH communications, in accordance with various aspects of the present disclosure.

As shown in FIG. 12, in some aspects, the UE 120 may determine that there are multiple PUSCH communications 1205 (e.g., shown as a first PUSCH communication 1205-1 and a second PUSCH communication 1205-2) to be multiplexed with a PUCCH communication 1210 (e.g., that overlap with one or more symbols of the PUCCH communication 1210). In some aspects, the PUCCH communication 1210 may start in an earlier symbol than all of the multiple PUSCH communications 1205. In this case, if all of the uplink grants 1215 corresponding to the PUSCH communications 1205 are received before the threshold time, then the UE 120 may multiplex the PUCCH communication 1210 with one or more of the multiple PUSCH communications 1205.

In some aspects, the UE 120 may determine which of the multiple PUSCH communications 1205 has an earliest starting symbol, and may piggyback the PUCCH communication 1210 in the PUSCH communication 1205 that has the earliest starting symbol. For example, in example 1200, the UE 120 may piggyback the PUCCH communication 1210 in the first PUSCH communication 1205-1. In some aspects, the UE 120 may not piggyback the PUCCH communication 1210 in the second PUSCH communication 1205-2 (e.g., that has the later starting symbol). In this way, latency for the PUCCH may be reduced.

In some aspects, the UE 120 may determine which of the multiple PUSCH communications 1205 has the largest number of assigned resources, and may piggyback the PUCCH communication 1210 in the PUSCH communication 1205 that has the largest number of assigned resources. In this way, reliability may be enhanced by puncturing or occupying a smaller ratio of resources of a PUSCH communication 1205.

In some aspects, the UE 120 may piggyback the PUCCH communication 1210 in multiple PUSCH communications 1205. For example, in example 1200, the UE 120 may piggyback the PUCCH communication 1210 in both the first PUSCH communication 1205-1 and the second PUSCH communication 1205-2. In some aspects, when piggybacking the PUCCH communication 1210 in multiple PUSCH communications 1205, the UE 120 may apply one or more rules of piggybacking UCI on the PUSCH with frequency hopping. For example, the multiple PUSCH communications 1205 may be treated as different frequency hops of one PUSCH for the purpose of applying these rule(s), even if none of the PUSCH communications 1205 are configured with frequency hopping. In this way, the likelihood of a base station 110 receiving the PUCCH communication 1210 may be increased.

While operations of FIG. 12 are described in connection with a UE 120, similar operations may be performed by a base station 110, in a similar manner as described above in connection with FIG. 8. In some aspects, the base station 110 and the UE 120 may store a same set of rules regarding multiplexing a PUCCH communication with respect to multiple overlapping PUSCH communications so that information transmitted by the UE 120 in overlapping symbols may be appropriately decoded and/or interpreted by the base station 110. In some aspects, one or more of these rules may be hard coded in memory of the base station 110 and/or the UE 120 (e.g., based at least in part on a 3GPP specification). Additionally, or alternatively, one or more of these rules may be indicated to the UE 120 by the base station 110 (e.g., in an RRC message, in DCI, and/or the like). In this way, the UE 120 may be flexibly configured.

As indicated above, FIG. 12 is provided as an example. Other examples are possible and may differ from what was described with respect to FIG. 12.

FIG. 13 is a diagram illustrating an example process 1300 performed, for example, by a UE, in accordance with various aspects of the present disclosure. Example process 1300 is an example where a UE (e.g., UE 120 and/or the like) performs operations associated with selectively multiplexing PUSCH and PUCCH communications.

As shown in FIG. 13, in some aspects, process 1300 may include determining that a physical uplink shared channel (PUSCH) communication, scheduled by an uplink grant, and a physical uplink control channel (PUCCH) communication, corresponding to a physical downlink shared channel (PDSCH) communication scheduled by a downlink grant, are scheduled to overlap in one or more symbols (block 1310). For example, the UE (e.g., using controller/processor 280 and/or the like) may determine that a PUSCH communication and a PUCCH communication are scheduled to overlap in one or more symbols, as described above in connection with FIGS. 7-12. In some aspects, the PUSCH communication may be scheduled by an uplink grant. In some aspects, the PUCCH communication may be scheduled by a downlink grant.

As further shown in FIG. 13, in some aspects, process 1300 may include determining a threshold time based at least in part on an earliest scheduled starting time of the PUSCH communication or the PUCCH communication (block 1320). For example, the UE (e.g., using controller/ processor 280 and/or the like) may determine a threshold time based at least in part on an earliest scheduled starting time of the PUSCH communication or the PUCCH communication, as described above in connection with FIGS. 7-12.

As further shown in FIG. 13, in some aspects, process 1300 may include selectively multiplexing the PUSCH communication and the PUCCH communication based at least in part on whether the uplink grant, the downlink grant, and a physical downlink shared channel (PDSCH) communication, corresponding to the PUCCH communication, are received before the threshold time (block 1330). For example, the UE (e.g., using controller/processor 280, transmit processor 264, TX MIMO processor 266, MOD 254, antenna 252, and/or the like) may selectively multiplex the PUSCH communication and the PUCCH communication based at least in part on whether the uplink grant, the downlink grant, and a PDSCH communication, corresponding to the PUCCH communication, are received before the threshold time, as described above in connection with FIGS. 7-12.

As further shown in FIG. 13, in some aspects, process 1300 may include transmitting the PUSCH communication, the PUCCH communication, or both the PUSCH communication and the PUCCH communication based at least in part on the selective multiplexing (block 1340). For example, the UE (e.g., using controller/processor 280, transmit processor 264, TX MIMO processor 266, MOD 254, antenna 252, and/or the like) may transmit the PUSCH communication, the PUCCH communication, or both the PUSCH communication and the PUCCH communication based at least in part on the selective multiplexing, as described above in connection with FIGS. 7-12.

Process 1300 may include additional aspects, such as any single aspect or any combination of aspects described below and/or in connection with one or more other processes described elsewhere herein.

In a first aspect, the PUSCH communication and the PUCCH communication are multiplexed by piggybacking uplink control information (UCI) of the PUCCH communication in the PUSCH communication by puncturing the PUSCH communication or by rate-matching the PUSCH communication around the UCI.

In a second aspect, alone or in combination with the first aspect, the PUSCH communication and the PUCCH communication are scheduled to start in different symbols, and wherein the earliest scheduled starting time is determined based at least in part on whichever of the PUSCH communication or the PUCCH communication is scheduled to start in an earlier symbol.

In a third aspect, alone or in combination with one or more of the first and second aspects, the PUSCH communication and the PUCCH communication are included in a same PUCCH group.

In a fourth aspect, alone or in combination with one or more of the first through third aspects, the UE is configured to multiplex the PUSCH communication and the PUCCH communication based at least in part on a determination that the uplink grant, the downlink grant, and a last symbol of the PDSCH communication are received before the threshold time.

In a fifth aspect, alone or in combination with one or more of the first through fourth aspects, the UE is configured to prevent multiplexing of the PUSCH communication and the PUCCH communication based at least in part on a determination that at least one of the uplink grant, the downlink grant, or a last symbol of the PDSCH communication is received after the threshold time.

In a sixth aspect, alone or in combination with one or more of the first through fifth aspects, the UE is configured to drop both the PUSCH communication and the PUCCH communication based at least in part on a determination that at least one of the uplink grant, the downlink grant, or a last symbol of the PDSCH communication is received after the threshold time.

In a seventh aspect, alone or in combination with one or more of the first through sixth aspects, the UE is configured to transmit one of and drop the other of the following based at least in part on a determination that at least one of the uplink grant, the downlink grant, or a last symbol of the PDSCH communication is received after the threshold time: the PUCCH communication, or the PUSCH communication.

In an eighth aspect, alone or in combination with one or more of the first through seventh aspects, the UE is configured to transmit one of and drop the other of the following based at least in part on a determination that at least one of the uplink grant, the downlink grant, or a last symbol of the PDSCH communication is received after the threshold time: whichever one of the PUCCH communication or the PUSCH that is scheduled to start in an earlier symbol, or whichever one of the PUCCH communication or the PUSCH that is scheduled to start in a later symbol.

In a ninth aspect, alone or in combination with one or more of the first through eighth aspects, the threshold time is determined based at least in part on a PUSCH processing time and a scheduled starting time of the PUSCH communication when the PUSCH communication is scheduled to start in an earlier symbol than the PUCCH communication.

In a tenth aspect, alone or in combination with one or more of the first through ninth aspects, the threshold time is determined based at least in part on a PUCCH processing time, a duration of the PDSCH communication or a preconfigured value, and a scheduled starting time of the PUCCH communication when the PUCCH communication is scheduled to start in an earlier symbol than the PUSCH communication.

In an eleventh aspect, alone or in combination with one or more of the first through tenth aspects, the threshold time is a number of symbols before an initial symbol of whichever one of the PUSCH communication or the PUCCH communication that starts in an earlier symbol.

In a twelfth aspect, alone or in combination with one or more of the first through eleventh aspects, the number corresponds to a maximum value of a first threshold time determined based at least in part on a PUSCH processing time and a second threshold time determined based at least in part on a PUCCH processing time.

In a thirteenth aspect, alone or in combination with one or more of the first through twelfth aspects, the threshold time is determined based at least in part on a PUSCH processing time or a PUCCH processing time.

In a fourteenth aspect, alone or in combination with one or more of the first through thirteenth aspects, the PUCCH communication is a first PUCCH communication that is multiplexed with the PUSCH communication based at least in part on a determination that the uplink grant, the downlink grant, and the PDSCH communication, corresponding to the first PUCCH communication, are received before the threshold time, and wherein a second PUCCH communication is scheduled to overlap one or more symbols of the PUSCH communication.

In a fifteenth aspect, alone or in combination with one or more of the first through fourteenth aspects, the UE is configured to multiplex a negative acknowledgement (NACK) corresponding to the second PUCCH communication with the PUSCH communication and the first PUCCH communication based at least in part on a determination that a downlink grant, that schedules the second PUCCH communication, is received before the threshold time and a last symbol of a PDSCH communication, corresponding to the second PUCCH communication, is received after the threshold time.

In a sixteenth aspect, alone or in combination with one or more of the first through fifteenth aspects, the UE is configured via a downlink assignment index (DAI), indicated in the downlink grant that schedules the second PUCCH communication, for acknowledgement or negative acknowledgement (ACK/NACK) feedback.

In a seventeenth aspect, alone or in combination with one or more of the first through sixteenth aspects, the UE is configured to drop the second PUCCH communication based at least in part on a determination that a downlink grant, that schedules the second PUCCH communication, is received before the threshold time and a last symbol of a PDSCH communication, corresponding to the second PUCCH communication, is received after the threshold time.

In an eighteenth aspect, alone or in combination with one or more of the first through seventeenth aspects, the UE is configured via a downlink assignment index (DAI), indicated in the downlink grant that schedules the first PUCCH communication, for acknowledgement or negative acknowledgement (ACK/NACK) feedback.

In a nineteenth aspect, alone or in combination with one or more of the first through eighteenth aspects, the UE is configured to multiplex an acknowledgement (ACK) corresponding to the second PUCCH communication with the PUSCH communication and the first PUCCH communication based at least in part on a determination that a physical downlink control channel (PDCCH) communication, that schedules the second PUCCH communication, is received before the threshold time and that the PDCCH communication does not schedule a PDSCH communication.

In a twentieth aspect, alone or in combination with one or more of the first through nineteenth aspects, the UE is configured to drop the second PUCCH communication based at least in part on a determination that a downlink grant, that schedules the second PUCCH communication, is received after the threshold time.

In a twenty-first aspect, alone or in combination with one or more of the first through twentieth aspects, the UE is configured via a downlink assignment index (DAI), indicated in the downlink grant that schedules the first PUCCH communication, for acknowledgement or negative acknowledgement (ACK/NACK) feedback.

In a twenty-second aspect, alone or in combination with one or more of the first through twenty-first aspects, the PUSCH communication is a first PUSCH communication that is multiplexed with the PUCCH communication based at least in part on a determination that the uplink grant, the downlink grant, and the PDSCH communication are received before the threshold time, and wherein a second PUSCH communication, scheduled by a downlink grant received before the threshold time, is scheduled to overlap one or more symbols of the PUCCH communication.

In a twenty-third aspect, alone or in combination with one or more of the first through twenty-second aspects, the PUCCH communication is piggybacked in the first PUSCH communication based at least in part on a determination that the first PUSCH communication has an earlier starting symbol than the second PUSCH communication.

In a twenty-fourth aspect, alone or in combination with one or more of the first through twenty-third aspects, the PUCCH communication is piggybacked in the first PUSCH communication based at least in part on a determination that the first PUSCH communication has a larger number of assigned resources than the second PUSCH communication.

In a twenty-fifth aspect, alone or in combination with one or more of the first through twenty-fourth aspects, the PUCCH communication is piggybacked in both the first PUSCH communication and the second PUSCH communication.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

FIG. 14 is a diagram illustrating an example process 1400 performed, for example, by a base station, in accordance with various aspects of the present disclosure. Example process 1400 is an example where a base station (e.g., base station 110 and/or the like) performs operations associated with selectively multiplexing PUSCH and PUCCH communications.

As shown in FIG. 14, in some aspects, process 1400 may include determining that a physical uplink shared channel (PUSCH) communication, scheduled by an uplink grant, and a physical uplink control channel (PUCCH) communication, corresponding to a physical downlink shared channel (PDSCH) communication scheduled by a downlink grant, are scheduled to overlap in one or more symbols (block 1410). For example, the base station (e.g., using controller/processor 240 and/or the like) may determine that a PUSCH communication and a PUCCH communication are scheduled to overlap in one or more symbols, as described above in connection with FIGS. 7-12. In some aspects, the PUSCH communication may be scheduled by an uplink grant. In some aspects, the PUCCH communication may be scheduled by a downlink grant.

As further shown in FIG. 14, in some aspects, process 1400 may include determining a threshold time based at least in part on an earliest scheduled starting time of the PUSCH communication or the PUCCH communication (block 1420). For example, the base station (e.g., using controller/processor 240 and/or the like) may determine a threshold time based at least in part on an earliest scheduled starting time of the PUSCH communication or the PUCCH communication, as described above in connection with FIGS. 7-12.

As further shown in FIG. 14, in some aspects, process 1400 may include decoding one or more signals, received in the one or more symbols, based at least in part on whether the uplink grant, the downlink grant, and the PDSCH communication are transmitted before the threshold time (block 1430). For example, the base station (e.g., using antenna 234, DEMOD 232, MIMO detector 236, receive processor 238, controller/processor 240, and/or the like) may decode one or more signals, received in the one or more symbols, based at least in part on whether the uplink grant, the downlink grant, and a PDSCH communication, corresponding to the PUCCH communication, are transmitted before the threshold time, as described above in connection with FIGS. 7-12.

Process 1400 may include additional aspects, such as any single aspect or any combination of aspects described in connection with one or more other processes described elsewhere herein.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

determining that a physical uplink shared channel (PUSCH) communication, scheduled by an uplink grant, and a physical uplink control channel (PUCCH) communication, corresponding to a physical downlink shared channel (PDSCH) communication scheduled by a downlink grant, are scheduled to overlap in one or more symbols;

determining a threshold time based at least in part on an earliest scheduled starting time of the PUSCH communication or the PUCCH communication;

selectively multiplexing the PUSCH communication and the PUCCH communication based at least in part on whether the uplink grant, the downlink grant, and the PDSCH communication are received before the threshold time, wherein the UE does not multiplex the PUSCH communication and the PUCCH communication if at least one of the uplink grant, the downlink grant, or a last symbol of the PDSCH communication is received after the threshold time; and transmitting the PUSCH communication, the PUCCH communication, or both the PUSCH communication and the PUCCH communication based at least in part on the selective multiplexing.

2. The method of claim 1, wherein the PUSCH communication and the PUCCH communication are multiplexed by piggybacking uplink control information (UCI) of the PUCCH communication in the PUSCH communication by puncturing the PUSCH communication or by rate-matching the PUSCH communication around the UCI.

3. The method of claim 1, wherein the PUSCH communication and the PUCCH communication are scheduled to start in different symbols, and wherein the earliest scheduled starting time is determined based at least in part on whichever of the PUSCH communication or the PUCCH communication is scheduled to start in an earlier symbol.

4. The method of claim 1, wherein the PUSCH communication and the PUCCH communication are included in a same PUCCH group.

5. The method of claim 1, wherein the UE is configured to multiplex the PUSCH communication and the PUCCH communication based at least in part on a determination that the uplink grant, the downlink grant, and a last symbol of the PDSCH communication are received before the threshold time.

6. The method of claim 1, wherein the UE is configured to drop both the PUSCH communication and the PUCCH communication based at least in part on a determination that at least one of the uplink grant, the downlink grant, or a last symbol of the PDSCH communication is received after the threshold time.

7. The method of claim 1, wherein the UE is configured to transmit one of and drop the other of the following based at least in part on a determination that at least one of the uplink grant, the downlink grant, or a last symbol of the PDSCH communication is received after the threshold time:
the PUCCH communication, or
the PUSCH communication.

8. The method of claim 1, wherein the UE is configured to transmit one of and drop the other of the following based at least in part on a determination that at least one of the uplink grant, the downlink grant, or a last symbol of the PDSCH communication is received after the threshold time:
whichever one of the PUCCH communication or the PUSCH communication that is scheduled to start in an earlier symbol, or
whichever one of the PUCCH communication or the PUSCH communication that is scheduled to start in a later symbol.

9. The method of claim 1, wherein the threshold time is determined based at least in part on a PUSCH processing time and a scheduled starting time of the PUSCH communication when the PUSCH communication is scheduled to start in an earlier symbol than the PUCCH communication.

10. The method of claim 1, wherein the threshold time is determined based at least in part on a PUSCH processing time, a duration of the PDSCH communication or a preconfigured value, and a scheduled starting time of the PUCCH communication when the PUCCH communication is scheduled to start in an earlier symbol than the PUSCH communication.

11. The method of claim 1, wherein the threshold time is a number of symbols before an initial symbol of whichever one of the PUSCH communication or the PUCCH communication that starts in an earlier symbol.

12. The method of claim 11, wherein the number corresponds to a maximum value of a first threshold time determined based at least in part on a PUSCH processing time and a second threshold time determined based at least in part on a PUCCH processing time.

13. The method of claim 1, wherein the threshold time is determined based at least in part on a PUSCH processing time or a PUCCH processing time.

14. The method of claim 1, wherein the PUCCH communication is a first PUCCH communication that is multiplexed with the PUSCH communication based at least in part on a determination that the uplink grant, the downlink grant, and the PDSCH communication, corresponding to the first PUCCH communication, are received before the threshold time, and wherein a second PUCCH communication is scheduled to overlap one or more symbols of the PUSCH communication.

15. The method of claim 14, wherein the UE is configured to multiplex a negative acknowledgement (NACK) corresponding to the second PUCCH communication with the PUSCH communication and the first PUCCH communication based at least in part on a determination that a downlink grant, that schedules the second PUCCH communication, is received before the threshold time and a last symbol of a PDSCH communication, corresponding to the second PUCCH communication, is received after the threshold time.

16. The method of claim 15, wherein the UE is configured via a downlink assignment index (DAI), indicated in the downlink grant that schedules the second PUCCH communication, for acknowledgement or negative acknowledgement (ACK/NACK) feedback.

17. The method of claim 14, wherein the UE is configured to drop the second PUCCH communication based at least in part on a determination that a downlink grant, that schedules the second PUCCH communication, is received before the threshold time and a last symbol of a PDSCH communication, corresponding to the second PUCCH communication, is received after the threshold time.

18. The method of claim 17, wherein the UE is configured via a downlink assignment index (DAI), indicated in the downlink grant that schedules the first PUCCH communication, for acknowledgement or negative acknowledgement (ACK/NACK) feedback.

19. The method of claim 14, wherein the UE is configured to multiplex an acknowledgement (ACK) corresponding to the second PUCCH communication with the PUSCH communication and the first PUCCH communication based at least in part on a determination that a physical downlink control channel (PDCCH) communication, that schedules the second PUCCH communication, is received before the threshold time and that the PDCCH communication does not schedule a PDSCH communication.

20. The method of claim 14, wherein the UE is configured to drop the second PUCCH communication based at least in part on a determination that a downlink grant, that schedules the second PUCCH communication, is received after the threshold time.

21. The method of claim 20, wherein the UE is configured via a downlink assignment index (DAI), indicated in the downlink grant that schedules the first PUCCH communication, for acknowledgement or negative acknowledgement (ACK/NACK) feedback.

22. The method of claim 1, wherein the PUSCH communication is a first PUSCH communication that is multiplexed with the PUCCH communication based at least in part on a determination that the uplink grant, the downlink grant, and the PDSCH communication are received before the threshold time, and wherein a second PUSCH communication, scheduled by a downlink grant received before the threshold time, is scheduled to overlap one or more symbols of the PUCCH communication.

23. The method of claim 22, wherein the PUCCH communication is piggybacked in the first PUSCH communication based at least in part on a determination that the first PUSCH communication has an earlier starting symbol than the second PUSCH communication.

24. The method of claim 22, wherein the PUCCH communication is piggybacked in the first PUSCH communication based at least in part on a determination that the first PUSCH communication has a larger number of assigned resources than the second PUSCH communication.

25. The method of claim 22, wherein the PUCCH communication is piggybacked in both the first PUSCH communication and the second PUSCH communication.

26. A user equipment (UE) for wireless communication, comprising:
memory; and
one or more processors operatively coupled to the memory, the memory and the one or more processors configured to:
determine that a physical uplink shared channel (PUSCH) communication, scheduled by an uplink grant, and a physical uplink control channel (PUCCH) communication, corresponding to a physical downlink shared channel (PDSCH) communication scheduled by a downlink grant, are scheduled to overlap in one or more symbols;
determine a threshold time based at least in part on an earliest scheduled starting time of the PUSCH communication or the PUCCH communication;
selectively multiplex the PUSCH communication and the PUCCH communication based at least in part on whether the uplink grant, the downlink grant, and the PDSCH communication are received before the threshold time, wherein the UE does not multiplex the PUSCH communication and the PUCCH communication if at least one of the uplink grant, the downlink grant, or a last symbol of the PDSCH communication is received after the threshold time; and
transmit the PUSCH communication, the PUCCH communication, or both the PUSCH communication and the PUCCH communication based at least in part on the selective multiplexing.

27. The UE of claim 26, wherein the PUSCH communication and the PUCCH communication are scheduled to start in different symbols, and wherein the earliest scheduled starting time is determined based at least in part on whichever of the PUSCH communication or the PUCCH communication is scheduled to start in an earlier symbol.

28. The UE of claim 26, wherein the UE is configured to multiplex the PUSCH communication and the PUCCH communication based at least in part on a determination that the uplink grant, the downlink grant, and a last symbol of the PDSCH communication are received before the threshold time.

29. The UE of claim 26, wherein the threshold time is determined based at least in part on a PUSCH processing time and a scheduled starting time of the PUSCH communication when the PUSCH communication is scheduled to start in an earlier symbol than the PUCCH communication.

30. The UE of claim 26, wherein the threshold time is determined based at least in part on a PUSCH processing time, a duration of the PDSCH communication or a preconfigured value, and a scheduled starting time of the PUCCH communication when the PUCCH communication is scheduled to start in an earlier symbol than the PUSCH communication.

31. The UE of claim 26, wherein the threshold time is a number of symbols before an initial symbol of whichever one of the PUSCH communication or the PUCCH communication that starts in an earlier symbol.

32. The UE of claim 31, wherein the number corresponds to a maximum value of a first threshold time determined based at least in part on a PUSCH processing time and a second threshold time determined based at least in part on a PUCCH processing time.

33. The UE of claim 26, wherein the threshold time is determined based at least in part on a PUSCH processing time or a PUCCH processing time.

34. The UE of claim 26, wherein the PUSCH communication is a first PUSCH communication that is multiplexed with the PUCCH communication based at least in part on a determination that the uplink grant, the downlink grant, and the PDSCH communication are received before the threshold time, and wherein a second PUSCH communication, scheduled by a downlink grant received before the threshold time, is scheduled to overlap one or more symbols of the PUCCH communication.

35. The UE of claim 34, wherein the PUCCH communication is piggybacked in the first PUSCH communication based at least in part on a determination that the first PUSCH communication has an earlier starting symbol than the second PUSCH communication.

* * * * *